US012737080B2

(12) United States Patent
Jeong

(10) Patent No.: US 12,737,080 B2
(45) Date of Patent: Sep. 15, 2026

(54) DISPLAY DEVICE INCLUDING SENSOR AND METHOD OF DRIVING DISPLAY DEVICE

(71) Applicant: Samsung Display Co., LTD., Yongin-si (KR)

(72) Inventor: Joo Hyeon Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/929,099

(22) Filed: Oct. 28, 2024

(65) Prior Publication Data

US 2025/0208734 A1 Jun. 26, 2025

(30) Foreign Application Priority Data

Dec. 26, 2023 (KR) ........................ 10-2023-0191192

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/044* (2013.01); *G06F 2203/04111* (2013.01)

(58) Field of Classification Search
CPC ...... G06F 3/0418; G06F 3/0412; G06F 3/044; G06F 2203/04111
See application file for complete search history.

(56) References Cited

U.S. PATENT DOCUMENTS

2015/0062061 A1* 3/2015 Hsu ...................... G09G 3/3648 345/87
2015/0062067 A1* 3/2015 Hong .................... G06F 3/0412 345/174
2015/0378498 A1* 12/2015 Huie ....................... G06F 1/169 345/174
2017/0262128 A1* 9/2017 Hua .................... G06F 3/04182
2019/0065000 A1* 2/2019 Kim ..................... G09G 3/2092
2025/0251832 A1* 8/2025 Monson ................ G06F 3/0418

* cited by examiner

*Primary Examiner* — Peter D McLoone
(74) *Attorney, Agent, or Firm* — Womble Bond Dickinson (US) LLP

(57) ABSTRACT

A display device includes a display panel having a first area and a second area; sensor electrodes in the first area and the second area; at least one sub-electrode in the first area and separated from the sensor electrodes; and a driver electrically connected to the sensor electrodes and the at least one sub-electrode, and configured to sense an input to the display panel based on a sensing signal received from the sensor electrodes and a reference signal received from the at least one sub-electrode.

21 Claims, 15 Drawing Sheets

FIG. 2

SDATA1

| | | | |
|---|---|---|---|
| CM11_1 | CM12_1 | ··· | CM1m_1 |
| CM21_1 | CM22_1 | ··· | CM2m_1 |
| ··· | ··· | ··· | ··· |
| CM(n-1)1_1 | CM(n-1)2_1 | ··· | CM(n-1)m_1 |
| CMn1_1 | CMn2_1 | ··· | CMnm_1 |

SDATA2

| | | | |
|---|---|---|---|
| CM11_2 | CM12_2 | ··· | CM1m_2 |
| CM21_2 | CM22_2 | ··· | CM2m_2 |
| ··· | ··· | ··· | ··· |
| CM(n-1)1_2 | CM(n-1)2_2 | ··· | CM(n-1)m_2 |
| CMn1_2 | CMn2_2 | ··· | CMnm_2 |

FIG. 8

DDATA1 (SDATA1-SDATA2)

| | | | |
|---|---|---|---|
| DV11<br>(CM11_1 - CM11_2) | DV12<br>(CM12_1 - CM12_2) | ... | DV1m<br>(CM1m_1 - CM1m_2) |
| DV21<br>(CM21_1 - CM21_2) | DV22<br>(CM22_1 - CM22_2) | ... | DV2m<br>(CM2m_1 - CM2m_2) |
| ... | ... | ... | ... |
| DV(n-1)1<br>(CM(n-1)1_1 - CM(n-1)1_2) | DV(n-1)2<br>(CM(n-1)2_1 - CM(n-1)2_2) | ... | DV(n-1)m<br>(CM(n-1)m_1 - CM(n-1)m_2) |
| DVn1<br>(CMn1_1 - CMn1_2) | DVn2<br>(CMn2_1 - CMn2_2) | ... | DVnm<br>(CMnm_1 - CMnm_2) |

Figure 9:
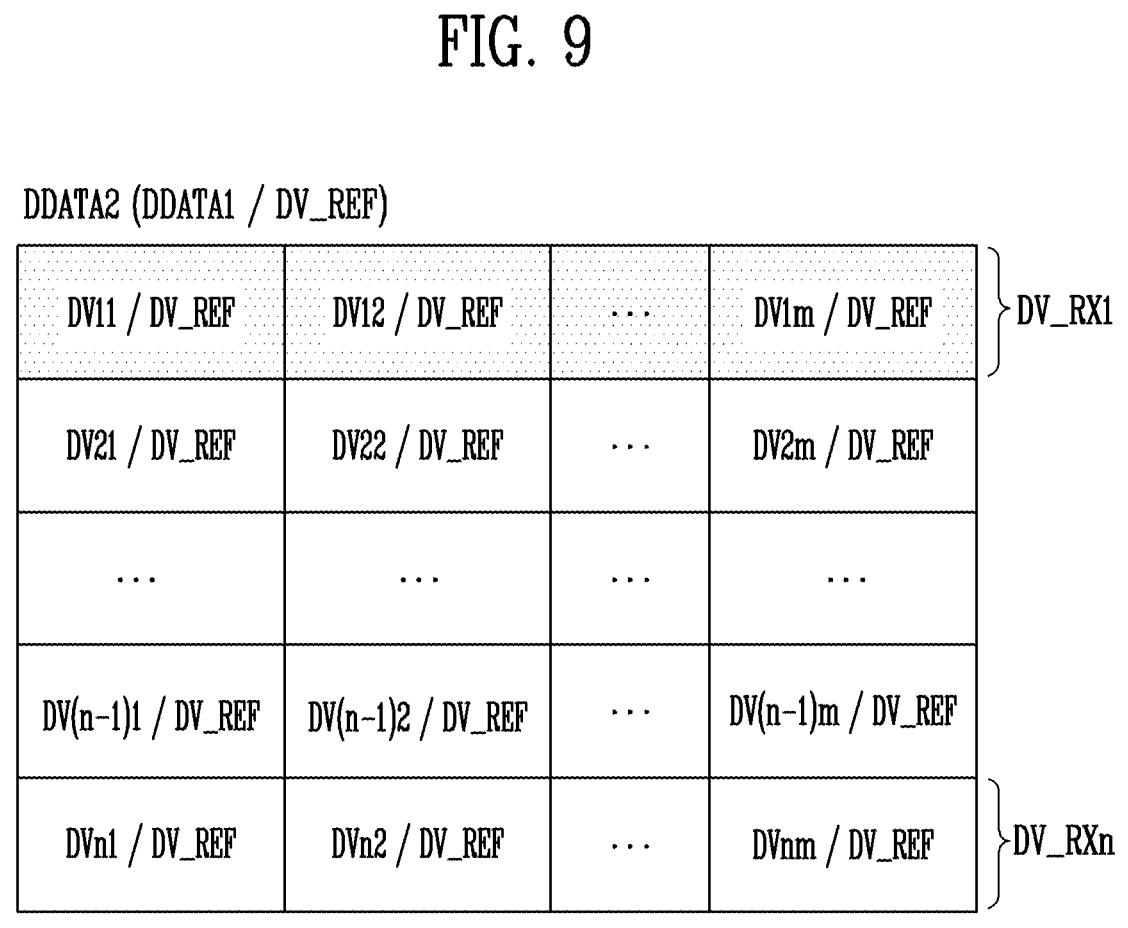

DDATA2 (DDATA1 / DV_REF)

| | | | | |
|---|---|---|---|---|
| DV11 / DV_REF | DV12 / DV_REF | ... | DV1m / DV_REF | DV_RX1 |
| DV21 / DV_REF | DV22 / DV_REF | ... | DV2m / DV_REF | |
| ... | ... | ... | ... | |
| DV(n-1)1 / DV_REF | DV(n-1)2 / DV_REF | ... | DV(n-1)m / DV_REF | |
| DVn1 / DV_REF | DVn2 / DV_REF | ... | DVnm / DV_REF | DV_RXn |

DISPLAY DEVICE INCLUDING SENSOR AND METHOD OF DRIVING DISPLAY DEVICE

CROSS-REFERENCE TO RELATED APPLICATION

The present application claims priority to and the benefit of Korean Patent Application No. 10-2023-0191192, filed on, Dec. 26, 2023, in the Korean Intellectual Property Office, the entire disclosure of which is incorporated herein by reference.

BACKGROUND

1. Field

Aspects of the present disclosure relate to a display device including a sensor and a method of driving the display device.

2. Description of the Related Art

A display device may include a display unit for displaying an image and a sensor unit for sensing an input by an object (e.g., a touch input from a user of the device). The sensor unit may measure a coordinate of a point where the input by the object is generated.

The above information disclosed in this Background section is only for enhancement of understanding of the background of the invention and therefore it may contain information that does not form the prior art.

SUMMARY

Aspects of the present disclosure are directed a display device capable of accurately sensing a touch input by an object and a method of driving the display device.

However, aspects of the present disclosure are not limited thereto, and other technical aspects and objects that are not described will be clearly understood by those skilled in the art from the following description.

According to some embodiments of the present disclosure, there is provided a display device including: a display panel having a first area and a second area; sensor electrodes in the first area and the second area; at least one sub-electrode in the first area and separated from the sensor electrodes; and a driver electrically connected to the sensor electrodes and the at least one sub-electrode, and configured to sense an input to the display panel based on a sensing signal received from the sensor electrodes and a reference signal received from the at least one sub-electrode.

In some embodiments, the at least one sub-electrode is not on the second area, and a number of the at least one sub-electrode is less than a number of the sensor electrodes.

In some embodiments, the sensor electrodes extend in a first direction and are arranged along a second direction, and the at least one sub-electrode extends in the first direction, in a plan view.

In some embodiments, the sensor electrodes include a first sensor electrode positioned in the first area, the at least one sub-electrode includes a first sub-electrode, and the first sub-electrode is positioned inside the first sensor electrode and is substantially surrounded by the first sensor electrode in a plan view.

In some embodiments, the first area is positioned outside the second area, and the first and second areas are centered at a center area of the display panel in a plan view.

In some embodiments, the at least one sub-electrode includes a first sub-electrode and a second sub-electrode, the first sub-electrode is positioned in a first peripheral area corresponding to a first side of the display panel, and the second sub-electrode is positioned in a second peripheral area corresponding to a second side of the display panel opposite the first side.

In some embodiments, the first area is positioned inside the second area in a plan view.

In some embodiments, the sensor electrodes include a first sensor electrode in the first area and second sensor electrodes in the second area, and the driver is configured to sense an input to the first area based on a first sensing signal received from the first sensor electrode and the reference signal, and to sense an input to the second area based on a second sensing signal received from each of the second sensor electrodes except for the reference signal.

In some embodiments, the display panel displays an image in a frame period, the frame period includes an active period and a blank period, and the driver is configured to receive first sensing signals from the sensor electrodes in the active period, to receive second sensing signals from the sensor electrodes in the blank period, and to determine whether noise due to the display panel exists based on a difference between the first sensing signals and the second sensing signals.

In some embodiments, in response to the difference in the first area being outside a reference range, the driver is configured to determine that the noise exists in the first area and to sense the input based on the reference signal and the sensing signal, and, in response to the difference in the first area being within the reference range, the driver is configured to determine that the noise does not exist in the first area and to sense the input based on the sensing signal and not the reference signal.

In some embodiments, the reference range is set based on the difference in the second area.

In some embodiments, the driver is configured to calculate the difference at each of a plurality of points in the first area, and to determine that the noise exists in the first area in response to a number of points for which the difference is outside the reference range exceeding a reference number.

In some embodiments, the display panel includes: a light emitting element on a substrate; and an insulating layer on the light emitting element and covering the light emitting element, and wherein the sensor electrodes and the at least one sub-electrode are directly on the insulating layer.

In some embodiments, the sensor electrodes overlap a cathode electrode of the light emitting element in the second area, and a portion of the sensor electrodes does not overlap the cathode electrode or a thickness of the cathode electrode is thinner than an average thickness of the cathode electrode in the first area.

According to some embodiments of the present disclosure, there is provided a display device including: a display panel; sensor electrodes and sub-electrodes on the display panel, the sensor electrodes including a first sensor electrode and a second sensor electrode, and the sub-electrodes including a first sub-electrode paired with the first sensor electrode and a second sub-electrode paired with the second sensor electrode; and a driver electrically connected to the sensor electrodes and the sub-electrodes and configured to sense an input to the display panel based on a sensing signal received from the sensor electrodes and a reference signal received from the sub-electrodes, wherein the driver is configured to sense a first input at a position corresponding to the first sensor electrode based on a first sensing signal of the first sensor electrode and a first reference signal of the first sub-electrode, and to sense a second input at a position corresponding to the second sensor electrode based on a second sensing signal of the second sensor electrode except for a second reference signal of the second sub-electrode.

In some embodiments, the sensor electrodes extend in a first direction and are arranged along a second direction, and the sub-electrodes extend in the first direction and are arranged along the second direction in a plan view.

In some embodiments, the first sub-electrode is positioned inside the first sensor electrode and is substantially surrounded by the first sensor electrode, and the second sub-electrode is positioned inside the second sensor electrode and is substantially surrounded by the second sensor electrode in a plan view.

In some embodiments, the display panel displays an image in a frame period, the frame period includes an active period and a blank period, and the driver is configured to receive first sensing signals from the sensor electrodes in the active period, to receive second sensing signals from the sensor electrodes in the blank period, and to identify the first sensor electrode and the second sensor electrode based on a difference between the first sensing signals and the second sensing signals.

In some embodiments, in response to the difference for one of the sensor electrodes being outside a reference range, the driver is configured to identify one of the sensor electrodes as the first sensor electrode, and in response to the difference for one of the sensor electrodes being within the reference range, the driver is configured to identify one of the sensor electrodes as the second sensor electrode.

According to some embodiments of the present disclosure, there is provided a method of driving a display device including sensor electrodes on a display panel, the method including: receiving a first sensing signal from the sensor electrodes in an active period of a frame; receiving a second sensing signal from the sensor electrodes in a blank period of the frame; and identifying an area in which noise due to the display panel is generated based on a difference between the first sensing signal and the second sensing signal.

In some embodiments, the method further includes: sensing an input to the area based on a sensing signal received from the sensor electrodes and a reference signal received from a sub-electrode, and the sub-electrode is arranged as a pair with one of the sensor electrodes in the area.

The display device and the method of driving the display device according to some embodiments of the present disclosure may sense or determine an area where noise (e.g., unwanted electrical interference) occurs using the blank period of the frame, and perform a sensing operation using different sensing methods on the area where the noise occurs and a remaining area.

The display device according to some embodiments of the present disclosure may include the sub-electrode and the sensor electrode that are positioned as a pair in an area where noise is expected to occur, and may remove the noise using the sub-electrode. Therefore, a touch input by an object may be more accurately sensed.

Other aspects, features, and characteristics that are not described above will be more clearly understood from the accompanying drawings, claims, and detailed description.

BRIEF DESCRIPTION OF THE DRAWINGS

The above and other features of the present disclosure will become more apparent by describing in further detail embodiments thereof with reference to the accompanying drawings, in which:

FIG. 2 is a cross-sectional view illustrating the display device of FIG. 1 according to some embodiments of the present disclosure;

FIGS. 6, 7, 8, and 9 are diagrams illustrating a process of sensing noise in a touch panel driver included in the display device of FIG. 1 according to some embodiments of the present disclosure;

DETAILED DESCRIPTION

Figure 1:
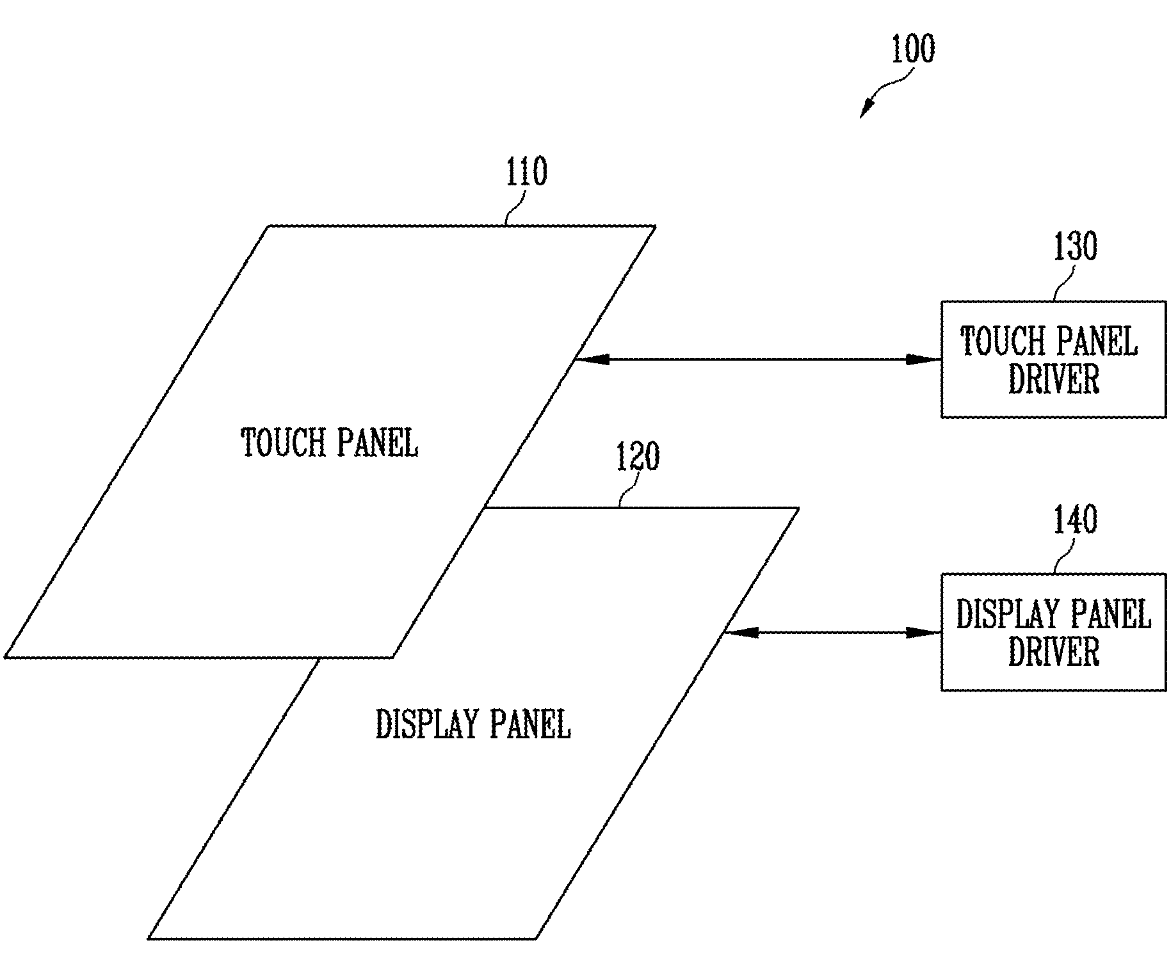
FIG. 1 is a diagram illustrating a display device according to some embodiments of the present disclosure.

The present disclosure may be modified in various suitable ways and may be embodied in various suitable forms. Therefore, specific embodiments will be illustrated in the drawings and will be described in detail in the specification. However, it should be understood that the present disclosure is not intended to be limited to the disclosed specific forms, and the present disclosure includes all modifications, equivalents, and substitutions within the spirit and technical scope of the present disclosure.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, if the term "substantially" is used in combination with a feature that could be expressed using a numeric value, the term "substantially" denotes a range of +/−5% of the value centered on the value.

As used herein, the terms "use," "using," and "used" may be considered synonymous with the terms "utilize," "utilizing," and "utilized," respectively.

The aspects and features of the present disclosure and the methods of achieving them will become apparent with reference to the embodiments described in detail later together with the accompanying drawings. However, the present disclosure is not limited to the embodiments disclosed below, and may be implemented in various different forms. In the following description, a case where a portion is connected to another portion includes a case where they are electrically connected to each other with another element interposed therebetween as well as a case in which they are directly connected to each other. In some embodiments of the present disclosure, a term "connection" between two configurations may mean that both of an electrical connection and a physical connection are inclusively used.

Hereinafter, a display device according to some embodiments of the present disclosure is described with reference to drawings related to some embodiments of the present disclosure.

FIG. 1 is a diagram illustrating a display device according to some embodiments of the present disclosure.

Referring to FIG. 1, the display device 100 may include a touch panel 110 (or an input sensing panel), a display panel 120, a touch panel driver 130 (or a first driver), and a display panel driver 140 (or a second driver). The touch panel 110 and the touch panel driver 130 form an input sensing device (or a sensor).

The touch panel 110 may sense an external input such as touch, pressure, fingerprint, hovering, proximity, and motion. For example, the touch panel 110 may include touch sensors. In some embodiments (e.g., in a mutual capacitance method), the touch sensors may include driving electrodes and sensing electrodes. In some other embodiments (e.g., in a self-capacitance method), the touch sensors may utilize of only one type of sensor.

The display panel 120 displays an image. For example, the display panel 120 may be implemented as a self-emission type of display panel, such as an organic light emitting display panel. In this case, the display panel 120 may include an organic light emitting element (e.g., an organic light emitting diode), an inorganic light emitting element (e.g., an inorganic light emitting diode), a quantum dot/well light emitting element (e.g., a quantum dot/well light emitting diode), or the like. In other examples, the display panel 120 may be implemented as a non-emission type display panel, such as a liquid crystal display panel. When the display panel 120 is implemented as a non-emissive type, the display device 100 may additionally include a light source such as a back-light unit.

In FIG. 1, the touch panel 110 and the display panel 120 are separated from each other. However, this is only for functionally separating the touch panel 110 and the display panel 120 in the display device 100. For example, the touch panel 110 may be formed in a process separated from that of the display panel 120, and the touch panel 110 and the display panel 120 may be coupled to each other (e.g., the touch panel 110 may be attached and coupled to one surface of the display panel 120). That is, the touch panel 110 may be formed as an add-on type. In some examples, the touch panel 110 and the display panel 120 may be formed in one process (e.g., a process of manufacturing the display panel 120). That is, the touch panel 110 may be formed as an in-cell type.

The touch panel 110 may be provided on one surface of the display panel 120. For example, the touch panel 110 may be disposed on one surface (e.g., an upper surface) from an image is emitted. In some other embodiments, the touch panel 110 may be directly formed on at least one of the opposite surfaces of the display panel 120 or may be formed inside the display panel 120. For example, the touch panel 110 may be directly formed on an outer surface of an upper substrate or a lower substrate of the display panel 120 (i.e., an upper surface of the upper substrate or a lower surface of the lower substrate), or may be directly formed on an inner surface of the upper surface (i.e., a lower surface of the upper substrate) or an inner surface of the lower substrate (i.e., an upper surface of the lower substrate).

The touch panel driver 130 is electrically connected to the touch panel 110 to drive the touch panel 110. For example, the touch panel driver 130 may provide a driving signal to the touch sensors and receive a sensing signal from the touch sensor.

The display panel driver 140 may be electrically connected to the display panel 120 to drive the display panel 120. For example, the display panel driver 140 may provide a data signal to the display panel 120.

In some embodiments, each of the touch panel driver 130 and the display panel driver 140 may be implemented as an integrated circuit (IC). In some other embodiments, at least a portion of the touch panel driver 130 and the display panel driver 140 may be integrated in one IC together.

Figure 2:
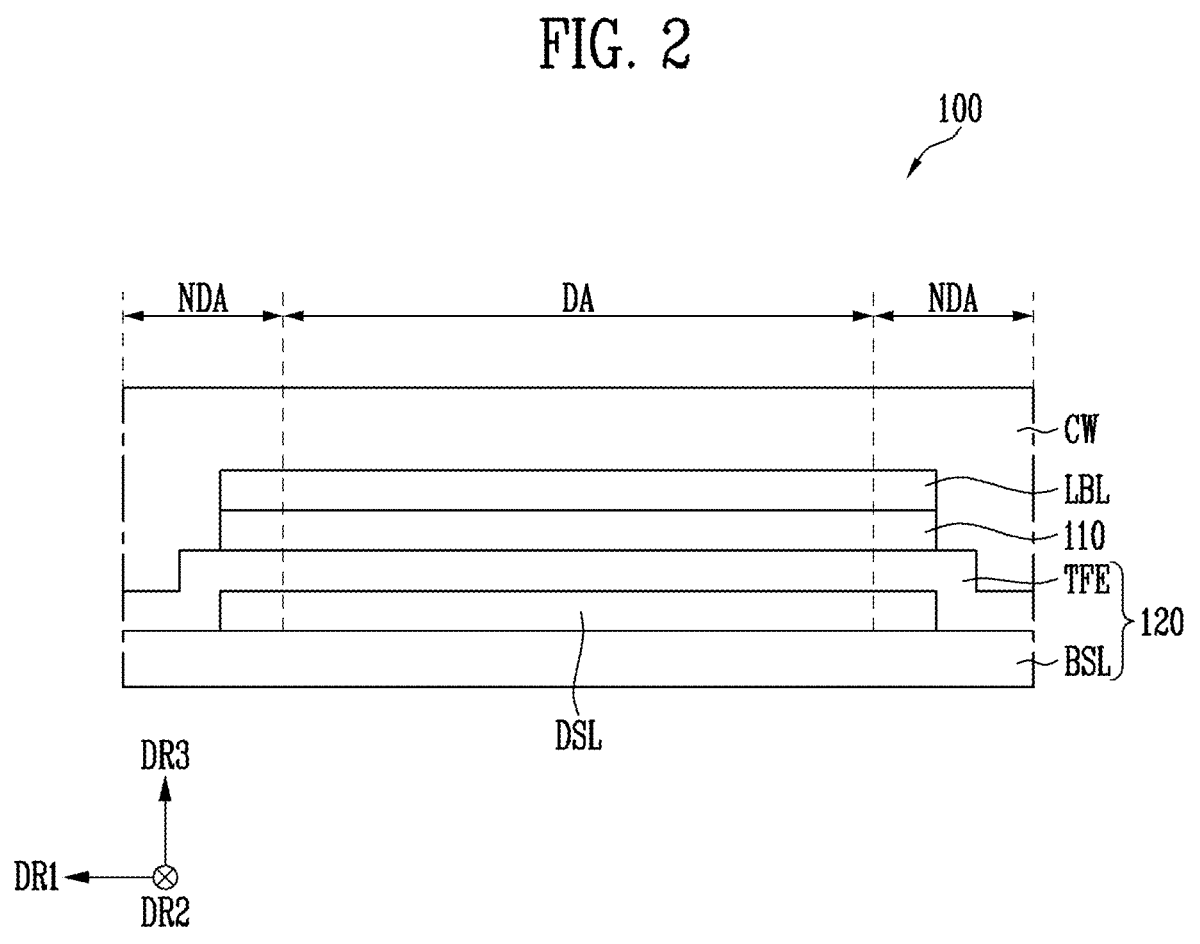

FIG. 2 is a cross-sectional view illustrating the display device of FIG. 1 according to some embodiments of the present disclosure.

Referring to FIG. 2, the touch panel 110 may be disposed on the display panel 120, and a cover window CW may be disposed on the touch panel 110.

The display panel 120 may include a substrate BSL, an element layer DSL, an encapsulation layer TFE, and a light blocking layer LBL.

The substrate BSL may support the element layer DSL. The substrate BSL may include an insulating material. For example, the insulating material may include at least one of glass, quartz, ceramic, and plastic. The substrate BSL may be a rigid substrate, and according to some embodiments, the substrate BSL may be a flexible substrate.

The element layer DSL may be positioned on the substrate BSL. The element layer DSL may include a sub-pixel and a signal line. The sub-pixel may include a light emitting element, a transistor, and a capacitor. The signal line may include a gate line configured to transmit a gate signal to each sub-pixel and a data line configured to transmit a data voltage. The sub-pixel included in the element layer DSL may be positioned in a display area DA.

The encapsulation layer TFE may be disposed on the element layer DSL. The encapsulation layer TFE may protect the element layer DSL from external moisture, oxygen, and/or the like. The encapsulation layer TFE may include two or more insulating layers formed on the element layer DSL. For example, the encapsulation layer TFE may include an inorganic layer formed on the element layer DSL, an organic layer formed on the inorganic layer, and an inorganic layer disposed on the organic layer. In some embodiments, the encapsulation layer TFE may be formed of a glass substrate and may cover the element layer DSL. The encapsulation layer TFE may cover the element layer DSL in the display area DA and a non-display area NDA.

The touch panel 110 may be disposed on the encapsulation layer TFE. In some embodiments, the touch panel 110 may be directly formed on the encapsulation layer TFE. In some embodiments, the touch panel 110 may be formed through a process separated from the display panel 120 and may be disposed (e.g., attached) on the encapsulation layer TFE. The touch panel 110 may have a sensing area in at least a partial area of an area overlapping the display area DA.

The light blocking layer LBL may include a color filter and a light blocking member. According to some examples, the light blocking layer LBL may be omitted.

The cover window CW may be disposed on the touch panel 110. The cover window CW may protect the display panel 120 and the touch panel 110 from an external impact, and the like. The cover window CW may be implemented as a film of a light-transmissive (e.g., transparent) material, for example, a glass and/or plastic material.

Figure 3:
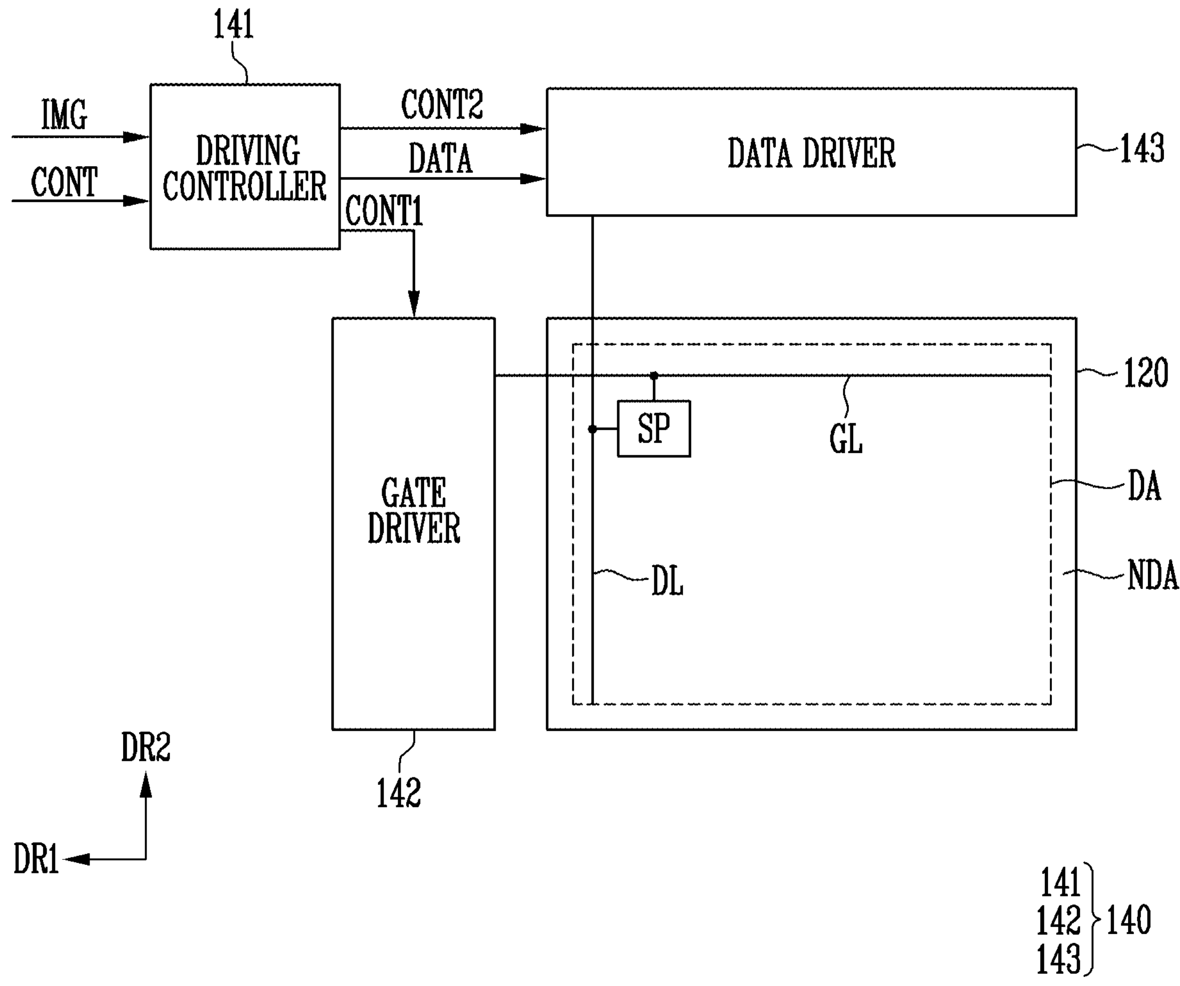
FIG. 3 is a block diagram illustrating a display panel and a display panel driver included in the display device of FIG. 1 according to some embodiments of the present disclosure.

FIG. 3 is a block diagram illustrating the display panel and the display panel driver included in the display device of FIG. 1 according to some embodiments of the present disclosure.

Referring to FIG. 3, the display panel 120 may include the display area DA for displaying an image and the non-display area NDA disposed adjacent to (e.g., surrounding) the display area DA.

The display panel 120 may include a gate line GL, a data line DL, and a sub-pixel SP. The sub-pixel SP may be electrically connected to the gate line GL and the data line DL. The gate line GL may extend in a first direction DR1, and the data line DL may extend in a second direction DR2 crossing the first direction DR1.

The display panel driver 140 may include a driving controller 141, a gate driver 142, and a data driver 143. In some embodiments, the driving controller 141 and the data driver 143 may be integrated into one chip. In some embodiments, the gate driver 142 may be mounted in the non-display area NDA of the display panel 120.

The driving controller 141 may receive input image data IMG and an input control signal CONT from a main processor (e.g., a graphic processing unit (GPU) or the like). For example, the input image data IMG may include red image data, green image data, and blue image data. For example, the input control signal CONT may include a master clock signal and a data enable signal. The input control signal CONT may further include a vertical synchronization signal and a horizontal synchronization signal.

The driving controller 141 may generate a first control signal CONT1, a second control signal CONT2, and a data signal DATA based on the input image data IMG and the input control signal CONT. For example, the first control signal CONT1 may include a vertical start signal and a gate clock signal, and the second control signal CONT2 may include a horizontal start signal and a load signal.

The gate driver 142 may generate a gate signal in response to the first control signal CONT1. The gate driver 142 may output the gate signal to the gate line GL.

The data driver 143 may generate a data voltage by converting the data signal DATA into an analog voltage in response to the second control signal CONT2. The data driver 143 may output the data voltage to the data line DL.

Figure 4:
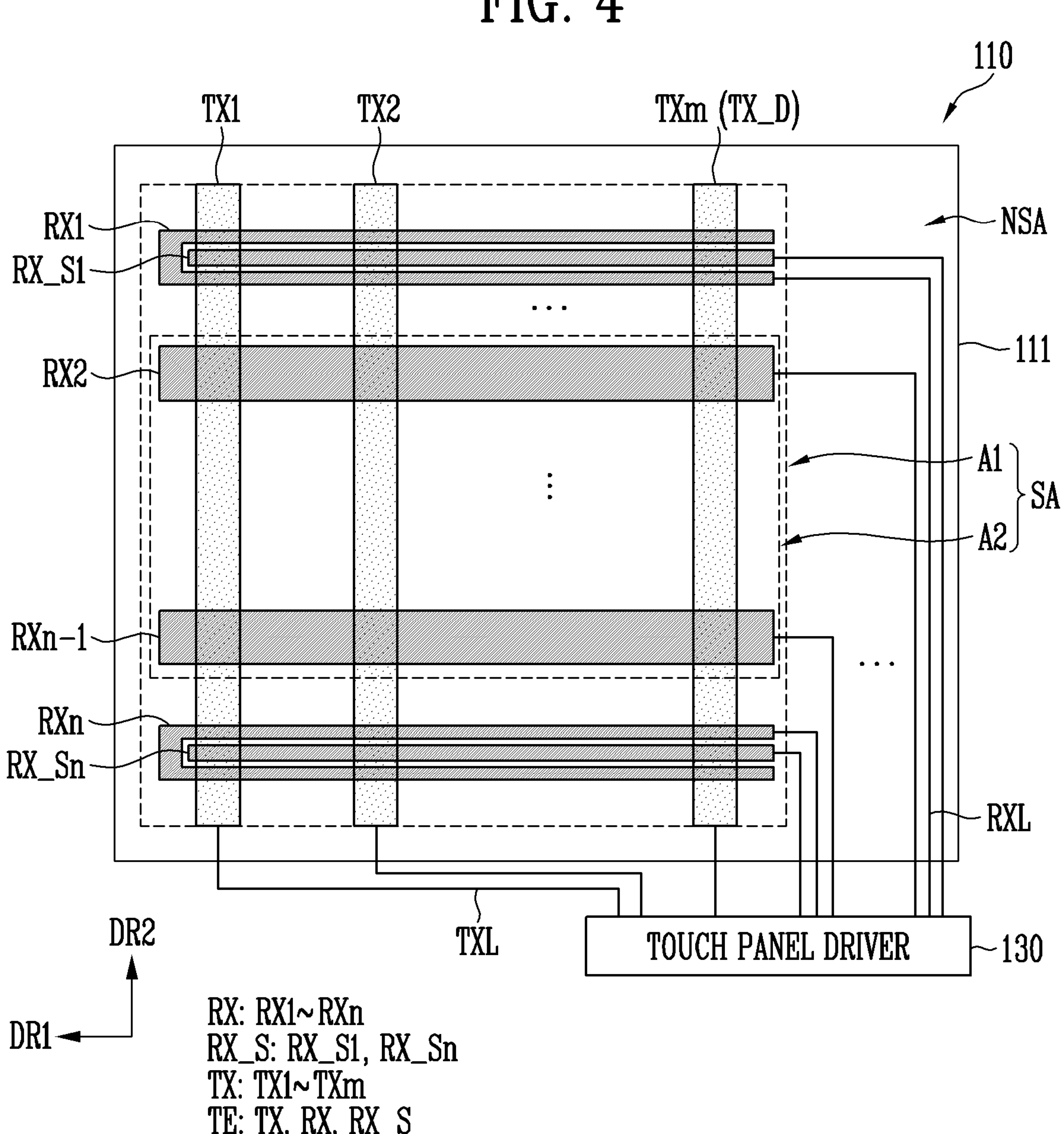
FIG. 4 is a plan view illustrating a touch panel included in the display device of FIG. 1 according to some embodiments of the present disclosure.

FIG. 4 is a plan view illustrating the touch panel included in the display device of FIG. 1 according to some embodiments of the present disclosure. For convenience of description, the touch panel driver 130 is also shown in FIG. 4.

Referring to FIG. 4, the touch panel 110 may include a base layer 111 (or a touch substrate). The base layer 111 may be the encapsulation layer TFE of FIG. 2 or may correspond thereto. The base layer 111 may include a sensing area SA and a non-sensing area NSA.

Sensor electrodes TE (e.g., sensors or touch electrodes) for sensing an external input may be provided and/or formed in the sensing area SA.

Lines TXL and RXL electrically connected to the sensor electrodes TE and to receive and transmit a sensing signal may be provided and/or formed in the non-sensing area NSA. However, the present disclosure is not limited thereto, and the lines TXL and RXL may be provided in the sensing area SA. The lines TXL and RXL may be electrically connected to the touch panel driver 130.

The sensor electrodes TE may include a driving electrode TX (e.g., first sensor electrodes or first sensors) and a sensing electrode RX (e.g., second sensor electrodes or second sensors).

The driving electrodes TX may extend in the second direction DR2 and may be arranged along the first direction DR1. For example, the driving electrode TX may include a first driving electrode TX1, a second driving electrode TX2, and an m-th driving electrode TXm sequentially arranged along the first direction DR1. Here, m is a positive integer. The driving electrode TX may be connected to a driving line TXL. A driving signal may be provided to the driving electrode TX through the driving line TXL.

The sensing electrode RX may extend in the first direction DR1 and may be arranged along the second direction DR2. For example, the sensing electrode RX may include a first sensing electrode RX1, a second sensing electrode RX2, an (n−1)-th sensing electrode RXn−1, and an n-th sensing electrode RXn sequentially arranged along the second direction DR2. Here, n is a positive integer. The sensing electrode RX may be connected to a sensing line RXL. A sensing signal may be output from the sensing electrode RX through the sensing line RXL. The touch panel driver 130 may recognize an input (e.g., touch) by an object by sensing a change amount of a mutual capacitance formed between the driving electrode TX and the sensing electrode RX.

In some embodiments, the sensor electrodes TE may further include a sub-electrode RX_S. The sub-electrode RX_S may be disposed or formed in a first area A1 of the base layer 111 (or the display panel). The first area A1 may be an area where the sub-electrode RX_S is disposed, and the second area A2 may be a remainder of the sensing area SA except for (i.e., excluding) the first area A1. The sub-electrode RX_S is not disposed in the second area A2.

In some embodiments, the first area A1 may be positioned outside a second area A2 based on a center area of the base layer 111 (or the display panel). That is, the first and second areas A1 and A2 may be centered at the center (or center area) of the base layer 111 (or the display area). For example, with reference to FIG. 4, the first area A1 may correspond to an edge of the sensing area SA. For example, the first area A1 may include a first peripheral area corresponding to a first side (e.g., an upper side) of the base layer 111 (or the display panel) and a second peripheral area corresponding to a second side (e.g., a side facing (e.g., opposite to) the first side, for example, a lower side) of the base layer 111. However, the first area A1 is not limited to the embodiments shown in FIG. 4. The first area A1 may be variously changed in a suitable manner, and some other embodiments of the first area A1 are described later with reference to FIGS. 12 to 15.

In some embodiments, the sub-electrode RX_S may be disposed as a pair with the sensing electrode RX disposed in the first area A1. For example, the sub-electrode RX_S may include a first sub-electrode RX_S1 positioned in the first peripheral area and an n-th sub-electrode RX_Sn positioned in the second peripheral area. The first sub-electrode RX_S1 may extend in the first direction DR1 and may be paired with the first sensing electrode RX1. The first sub-electrode RX_S1 may be separated or spaced apart from the first sensing electrode RX1. The n-th sub-electrode RX_Sn may extend in the first direction DR1 and may be paired with the n-th sensing electrode RXn, and the n-th sub-electrode RX_Sn may be separated or spaced apart from the n-th sensing electrode RXn.

In some embodiments, the sub-electrode RX_S may be positioned inside the corresponding sensing electrode RX and may be substantially surrounded by (e.g., be surrounded on three sides by) the sensing electrode RX (e.g., in a plan view). For example, the first sub-electrode RX_S1 may be positioned inside the first sensing electrode RX1 and may be substantially surrounded by (e.g., be surrounded on three sides by) the first sensing electrode RX1 (e.g., in a plan view). As will be described later, the first sub-electrode RX_S1 may be used to sense noise (e.g., unwanted electrical interference) of the first sensing electrode RX1 (or the sensing signal output from the first sensing electrode RX1). The n-th sub-electrode RX_Sn may be positioned inside the n-th sensing electrode RXn and may be substantially surrounded by (e.g., be surrounded on three sides by) the n-th sensing electrode RXn (e.g., in a plan view).

The sub-electrode RX_S may be connected to the sensing line RXL. The sensing signal (or a reference signal) may be output from the sub-electrode RX_S through the sensing line RXL. The touch panel driver 130 may sense the input by the object based on the sensing signal received from the sensing electrode RX and the sensing signal (or the reference signal) received from the sub-electrode RX_S. For example, the touch panel driver 130 may remove noise of the sensing signal received from the first sensing electrode RX1 based on the sensing signal (or the reference signal) received from the first sub-electrode RX_S1, and may accurately sense the input by the object based on the sensing signal from which the noise is removed.

As described above, the touch panel 110 may include the sub-electrode positioned as a pair with the sensing electrode RX in a portion of the sensing area SA (or the first area A1, for example, an area corresponding to an upper side and a lower side of the sensing area SA). By using the sub-electrode, the noise of the sensing electrode RX may be removed, and the input by the object may be more accurately sensed.

Because the sub-electrode RX_S is disposed only in a portion of the sensing area SA, the number of sub-electrodes RX_S may be less than the number of sensing electrodes RX. In addition, compared to a case where the sub-electrode RX_S is disposed in the entire sensing area SA, the number of sensing lines RXL connected to the sub-electrode RX_S may be reduced, and a width of the non-sensing area NSA may be reduced.

Figure 5:
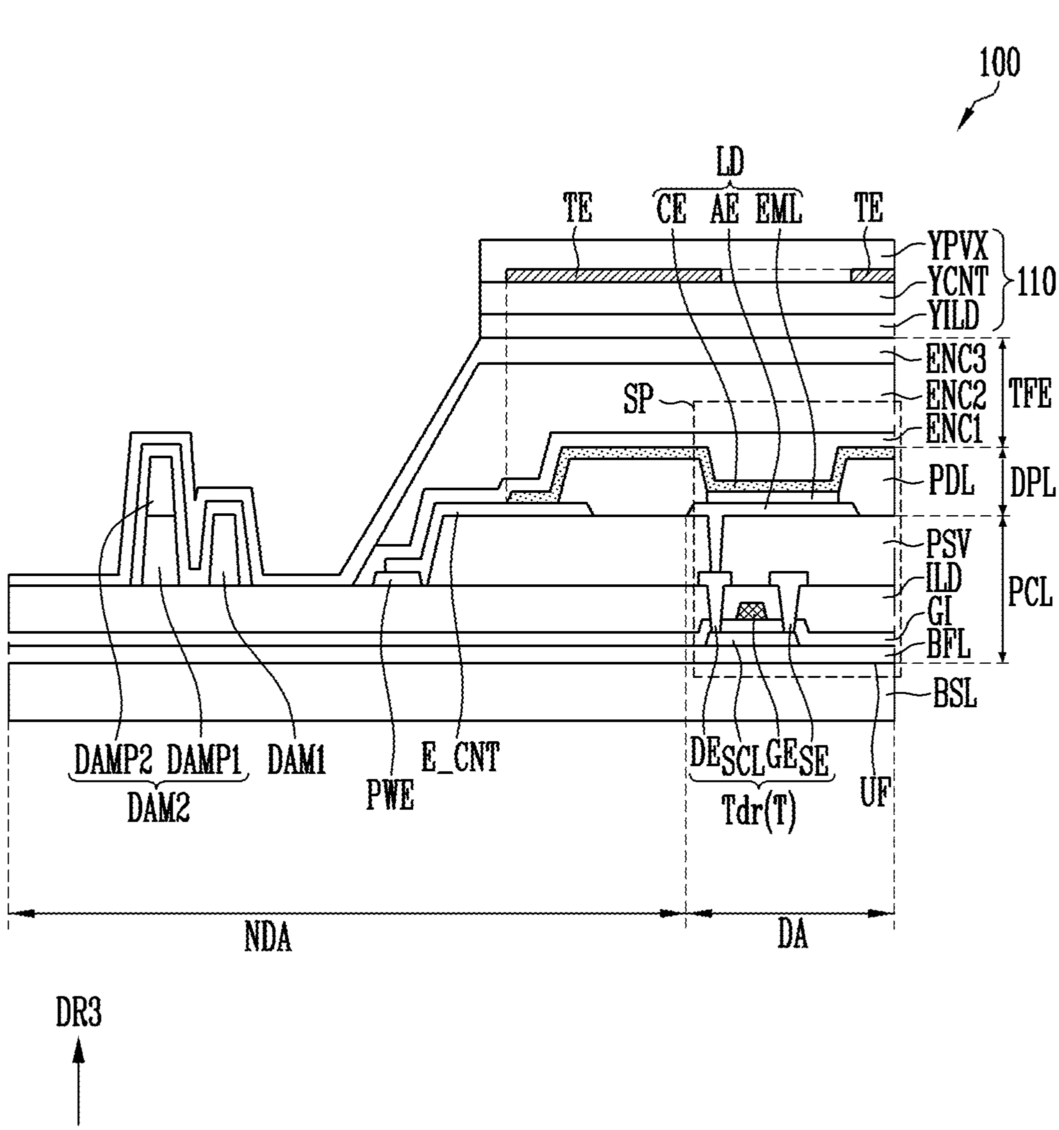
FIG. 5 is a cross-sectional view illustrating the display device of FIG. 1 according to some embodiments of the present disclosure.

FIG. 5 is a cross-sectional view illustrating the display device of FIG. 1 according to some embodiments of the present disclosure. FIG. 5 shows a cross-section of the display device 100 based on one side of the display device.

Referring to FIG. 5, the display device 100 may include the sub-pixel SP and a sensor electrode TE provided in the display area DA. Hereinafter, a stack structure of the display device 100 in the display area DA is described first, and then a stack structure of the display device 100 in the non-display area NDA is described.

The display device 100 may include a pixel circuit layer PCL, a display element layer DPL, the encapsulation layer TFE, and the touch panel 110 sequentially stacked on the substrate BSL. In the display area DA, the pixel circuit layer PCL may include a buffer layer BFL, a driving transistor Tdr, and a protective layer PSV. The driving transistor Tdr is a transistor that controls a driving current provided to a light emitting element LD, and because structures of transistors T included in the sub-pixel SP are substantially the same or similar to each other, only the driving transistor Tdr is shown as a representative example.

The buffer layer BFL may be provided and/or formed on one surface UF of the substrate BSL. The buffer layer BFL may prevent an impurity from diffusing into the driving transistor Tdr or substantially reduce such diffusion. The buffer layer BFL may be an insulating layer and may include an inorganic material. For example, the inorganic material may include a metal oxide such as silicon nitride ($SiN_x$), silicon oxide ($SiO_x$), silicon oxynitride (SiON), aluminum oxide ($AlO_x$), and/or the like. The buffer layer BFL may be omitted according to a material, a process condition, and the like of the substrate BSL.

The driving transistor Tdr may be provided on the buffer layer BFL (or the substrate BSL). The driving transistor Tdr may include a semiconductor pattern SCL, a gate electrode GE, a first terminal SE, and a second terminal DE. The first terminal SE may be any one of a source electrode and a drain electrode, and the second terminal DE may be the other electrode. For example, when the first terminal SE is a source electrode, the second terminal DE may be a drain electrode.

The semiconductor pattern SCL may be provided and/or formed on the buffer layer BFL. The semiconductor pattern SCL may include a first contact area contacting the first terminal SE and a second contact area contacting the second terminal DE. An area positioned between the first contact area and the second contact area and overlapping the gate electrode GE may be a channel area of the driving transistor Tdr. The semiconductor pattern SCL may be a semiconductor pattern formed of polysilicon, amorphous silicon, oxide semiconductor, and/or the like. The channel area may be a semiconductor pattern that is not doped with an impurity, and may be an intrinsic semiconductor. The first contact area and the second contact area may be semiconductor patterns doped with an impurity.

A gate insulating layer GI may be provided and/or formed on the semiconductor pattern SCL. The gate insulating layer GI may be an insulating layer and may include an inorganic material. However, the present disclosure is not limited thereto, and according to some embodiments, the gate insulating layer GI may include an organic material.

The gate electrode GE may be provided and/or formed on the semiconductor pattern SCL with the gate insulating layer GI interposed therebetween. The gate electrode GE may include a conductive material. For example, the conductive material may include a metal such as gold (Au), silver (Ag), aluminum (Al), molybdenum (Mo), chromium (Cr), titanium (Ti), nickel (Ni), neodymium (Nd), copper (Cu), and/or the like.

An interlayer insulating layer ILD may be provided and/or formed on the gate electrode GE. The interlayer insulating layer ILD may be an insulating layer and may include an inorganic material. The interlayer insulating layer ILD may be formed as a single-layer or multi-layer structure. According to some embodiments, the interlayer insulating layer ILD may include an organic material.

The respective first terminal SE and second terminal DE may be in contact with the first contact area and the second contact area of the semiconductor pattern SCL through a contact hole passing through an interlayer insulating layer ILD and the gate insulating layer GI. The first and second terminals SE and DE may include a conductive material. The first and second terminals SE and DE may be formed as a single-layer or multi-layer structure.

The protective layer PSV may be provided and/or formed on the driving transistor Tdr.

The protective layer PSV may be an insulating layer and may be provided in a form including an organic layer, an inorganic layer, or an organic layer disposed on an inorganic layer. The inorganic layer may include an inorganic material. The organic layer may include an organic material. For example, the organic material may include an acrylic resin (polyacrylates resin), an epoxy resin, a phenolic resin, a polyamide resin, a polyimides resin, an unsaturated polyesters resin, a poly-phenylene ethers resin, a poly-phenylene sulfides resin, a benzocyclobutene resin, and/or the like.

The display element layer DPL may be provided and/or formed on the protective layer PSV.

The display element layer DPL may be provided on the protective layer PSV and may include the light emitting element LD that emits light. The light emitting element LD may include first and second electrodes AE and CE and an emission layer EML provided between the two electrodes AE and CE. One of the first and second electrodes AE and CE may be an anode electrode, and a remaining electrode may be a cathode electrode. For example, a first electrode AE may be an anode electrode, and a second electrode CE may be a cathode electrode. When the light emitting element LD is a front surface emission type organic light emitting diode, the first electrode AE may be a reflective electrode, and the second electrode CE may be a transmissive electrode.

The first electrode AE may be electrically connected to the second terminal DE of the driving transistor Tdr through a contact hole passing through the protective layer PSV. The first electrode AE may include a reflective layer capable of reflecting light or a transparent conductive layer disposed on or under the reflective layer. For example, the transparent conductive layer may include a transparent conductive material, and the transparent conductive material may include a transparent conductive material such as ITO, IZO, IGZO, ITZO, and/or the like, and a conductive polymer such as PEDOT and/or the like. The reflective layer may include a metal material such as silver (Ag) and/or the like.

The display element layer DPL may further include a pixel defining layer PDL having an opening exposing a portion of the first electrode AE, for example, an upper surface of the first electrode AE. The pixel defining layer PDL may be an insulating layer and may include an organic material.

The emission layer EML may be disposed in an area corresponding to the opening of the pixel defining layer PDL. That is, the emission layer EML may be disposed on one surface of the exposed first electrode AE. The emission layer EML may have a multilayer thin film structure including at least light generation layer. The emission layer EML may include a hole injection layer that injects a hole, a hole transport layer having an excellent hole transport property and for increasing a chance of recombination of a hole and an electron by suppressing a movement of an electron that is not combined in the light generation layer, the light generation layer that emits light by the recombination of the injected electron and hole, a hole blocking layer for suppressing a movement of a hole that is not combined in the light generation layer, an electron transport layer for efficiently (or smoothly) transporting the electron to the light generation layer, and an electron injection layer for injecting the electron.

The second electrode CE may be provided and/or formed on the emission layer EML. The second electrode CE may be a common layer commonly provided to a pixel PXL and another pixel. The second electrode CE may be a transmissive electrode and may include a transparent conductive material.

The encapsulation layer TFE may be provided and/or formed on the second electrode CE.

The encapsulation layer TFE may include first, second, and third encapsulation layers ENC1, ENC2, and ENC3.

The first encapsulation layer ENC1 may be provided and/or formed on the display element layer DPL and may be positioned over at least a portion of the display area DA and the non-display area NDA. The second encapsulation layer ENC2 may be provided and/or formed on the first encapsulation layer ENC1 and may be positioned over at least a portion of the display area DA and the non-display area NDA. The third encapsulation layer ENC3 may be provided and/or formed on the second encapsulation layer ENC2 and may be positioned over at least a portion of the display area DA and the non-display area NDA. The first and third encapsulation layers ENC1 and ENC3 may be formed of an inorganic layer including an inorganic material, and the second encapsulation layer ENC2 may be formed of an organic layer including an organic material.

In FIG. 5, the display element layer DPL includes the light emitting element LD configured of the organic light emitting diode having the first electrode AE, the emission layer EML, and the second electrode CE, but is not limited thereto. According to some embodiments, the display element layer DPL may include ultra-small inorganic light emitting element LD as small as a micro-scale or a nano-scale formed in a structure in which a nitride-based semiconductor is grown.

The touch panel 110 may be disposed on the encapsulation layer TFE. The touch panel 110 may be directly disposed or formed on the encapsulation layer TFE using the encapsulation layer TFE as a base layer. In other words, the touch panel 110 may be directly formed on the encapsulation layer TFE through a process subsequent to a process of forming the encapsulation layer TFE.

The touch panel 110 may include insulating layers sequentially stacked on the encapsulation layer TFE, that is, a first insulating layer YILD, a second insulating layer YCNT, and a third insulating layer YPVX. In addition, the touch panel 110 may include the sensor electrode TE disposed between the insulating layers.

The first insulating layer YILD may be a buffer layer and may include an inorganic material, but is not limited thereto. According to some embodiments, the first insulating layer YILD may be omitted.

The second insulating layer YCNT may be disposed on the first insulating layer YILD. The first insulating layer YILD may be an insulating layer and may include an inorganic material, but is not limited thereto.

The sensor electrode TE may be disposed on the second insulating layer YCNT. The sensor electrode TE may be disposed on the light emitting element LD (or the pixel PX) and may not overlap the light emitting element LD in a third direction DR3. For example, a sensor pattern SP may have a mesh structure including a plurality of conductive fine lines and may have an opening corresponding to the light emitting element LD.

A power electrode PWE receiving driving power (e.g., a constant voltage) from an outside, and a connection electrode E_CNT connected to the power electrode PWE may be disposed in the non-display area NDA. The connection electrode E_CNT may electrically connect the power electrode PWE and the second electrode CE of the light emitting element LD as shown in FIG. 5. The connection electrode E_CNT may be formed through the same or substantially the same process as the first electrode AE and may include the same or substantially the same material as the first electrode AE1.

Dams DAM1 and DAM2 may be provided at an edge of the display device DP. For example, in a plan view, the dams DAM1 and DAM2 may be disposed along the edge of the display device DP. A second dam DAM2 may be disposed outside a first dam DAM1. The first dam DAM1 may be formed concurrently (e.g., simultaneously) with the protective layer PSV included in the pixel circuit layer PCL. The second dam DAM2 may include a lower portion DAMP1 formed concurrently (e.g., simultaneously) with the protective layer PSV included in the pixel circuit layer PCL, and an upper portion DAMP2 formed concurrently (e.g., simultaneously) with the pixel defining layer PDL included in the display element layer DPL. According to some embodiments, the dams DAM1 and DAM2 may be formed concurrently (e.g., simultaneously) with at least one insulating layer among insulating layers included in the pixel circuit layer PCL. The dams DAM1 and DAM2 may prevent a liquid organic material from overflowing to an outer area of the substrate BSL, or substantially reduce such overflowing, in a process of forming an organic layer included in the encapsulation layer TFE, for example, the second encapsulation layer ENC2.

In some embodiments, a portion of the sensor electrode TE may not overlap the second electrode CE in the third direction DR3, or a thickness of a portion of the sensor electrode TE may be thinner than an average thickness of the sensor electrode TE.

For example, in the display area DA, the sensor electrode TE may overlap the second electrode CE in the third direction DR3, and in the non-display area NDA, a portion of the sensor electrode TE may not overlap the second electrode CE in the third direction DR3. In other examples, a thickness of an edge portion of the second electrode CE overlapping the sensor electrode TE may be thinner than the average thickness.

The second electrode CE may overlap the sensor electrode TE, and thus may prevent or substantially reduce interference of a lower configuration (and a signal applied thereto) of the second electrode CE (e.g., a lower portion of the second electrode CE and the signal applied thereto) to the sensor electrode TE, thus, eliminating or reducing noise due to the lower configuration. However, when the sensor electrode TE does not overlap the second electrode CE or when the thickness of the second electrode CE is low, the lower configuration (e.g., the lower portion) of the second electrode CE may interfere with the sensor electrode TE and cause noise. Despite a process error, the second electrode CE may be formed wider to cover the entire sensor electrode TE, but the non-display area NDA may increase. The second electrode CE may be formed thicker, but an amount of light passing through the second electrode CE may decrease and a light emission characteristic of the display panel may be deteriorated.

Therefore, the display device (or the touch panel) according to some embodiments of the present disclosure may dispose the sub-electrode RX_S (e.g., refer to FIG. 4) in an area where noise is expected to occur, and may remove the noise using the sub-electrode RX_S.

FIGS. 6, 7, 8, and 9 are diagrams illustrating a process of sensing noise in the touch panel driver included in the display device of FIG. 1 according to some embodiments of the present disclosure.

Referring to FIGS. 1, 4, and 6 to 9, the display panel 120 may display an image in a unit of a frame period FRAME. A vertical synchronization signal V_SYNC may indicate a start of the frame period FRAME. The frame period FRAME may include a first period P1 and a second period P2. The first period P1 may be an active period in which a valid data signal VDATA is provided from the display panel driver 140 to the display panel 120, and the second period P2 may be a blank period between the active period and a next frame period FRAME. In the second period P2, the data signal VDATA does not have a valid value.

A blank signal VB_SYNC may indicate the second period P2. For example, the blank signal VB_SYNC may have a low level in the first period P1 and may have a high level in the second period P2. However, the present disclosure is not limited thereto. The blank signal VB_SYNC may be provided from the outside together with the vertical synchronization signal V_SYNC, and the touch panel driver 130 may operate in response to the blank signal VB_SYNC.

In some embodiments, the touch panel driver 130 may perform a first sensing operation in the first period P1, perform a second sensing operation in the second period P2, and determine whether noise (e.g., unwanted electrical interference) due to the display panel 120 exists based on a first sensing result and a second sensing result. The noise may occur in the first period P1 due to the valid data signal VDATA, and the noise may not occur in the second period P2 because the data signal VDATA does not have a valid value (e.g., a high value).

Figures 6, 7:
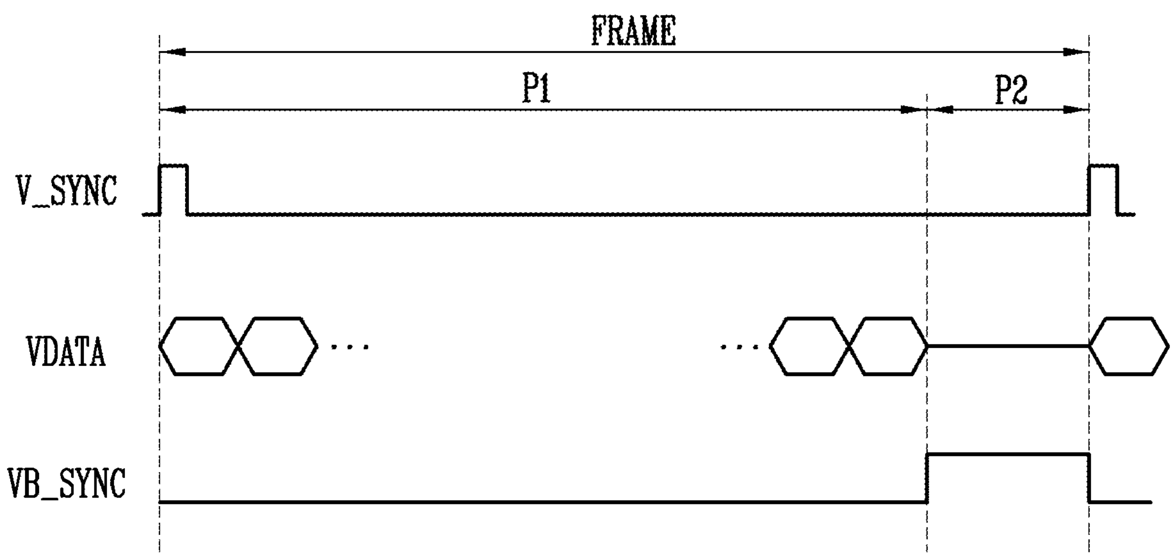

In some embodiments, the touch panel driver 130 may apply the driving signal to the driving electrode TX and receive the sensing signal (or first sensing signals) from the sensing electrode RX in the first period P1. The touch panel driver 130 may generate first sensing data SDATA1 based on the sensing signal of the first period P1. Referring to FIG. 7, the first sensing data SDATA1 may include eleventh to nm-th values CM11_1 to CMnm_1. The eleventh value CM11_1 may be a value calculated based on the sensing signal output from the first sensing electrode RX1 according to the driving signal applied to the first driving electrode TX1, and may indicate a capacitance (e.g., a parasitic capacitance) between the first sensing electrode RX1 and the first driving electrode TX1 in the first period P1. The nm-th value CMnm_1 may be a value calculated based on the sensing signal output from the n-th sensing electrode RXn according to the driving signal applied to the m-th driving electrode TXm, and may indicate a capacitance (e.g., an parasitic capacitance) between the n-th sensing electrode RXn and the m-th driving electrode TXm in the first period P1.

Similar to the operation in the first period P1, the touch panel driver 130 may apply the driving signal to the driving electrode TX and receive the sensing signal (or second sensing signals) in the second period P2. The touch panel driver 130 may generate second sensing data SDATA2 based on the sensing signal of the second period P2. Referring to FIG. 7, the second sensing data SDATA2 may include eleventh to nm-th values CM11_2 to CMnm_2. The eleventh value CM11_2 may indicate a capacitance (e.g., an parasitic capacitance) between the first sensing electrode RX1 and the first driving electrode TX1 in the second period P2. The nm-th value CMnm_2 may indicate a capacitance (e.g., an parasitic capacitance) between the n-th sensing electrode RXn and the m-th driving electrode TXm in the second period P2.

Because the sensing operations in the first period P1 and the second period P2 are for sensing noise, the sub-electrode RX_S (e.g., refer to FIG. 4) (or the sensing signal of the sub-electrode RX_S) for noise removal is not used, and only the sensing electrode RX (or the sensing signal of the sensing electrode RX) is used.

In some embodiments, the touch panel driver 130 may determine whether the noise exists based on a difference between the first sensing data SDATA1 and the second sensing data SDATA2. In other words, the touch panel driver 130 may determine whether the noise exists based on a difference between the sensing signal of the first period P1 and the sensing signal of the second period P2.

For example, with reference to FIG. 8, the touch panel driver 130 may generate first differential data DDATA1 by performing a difference operation on the first sensing data SDATA1 and the second sensing data SDATA2. The first differential data DDATA1 may include eleventh to nm-th differential values DV11 to DVnm. The eleventh differential value DV11 may be a difference between the eleventh value CM11_1 of the first period P1 and the eleventh value CM11_2 of the second period P2. Because the remaining differential values are the same as those shown in FIG. 8, a description of the remaining differential values is omitted.

For example, the touch panel driver 130 may determine that the noise exists at a corresponding position (or node) when the differential value is outside a reference range. That is, when a difference between a value in the first period P1 and a value in the second period P2 is high (e.g., outside of a reference range), it may be determined that the difference is due to the noise. The touch panel driver 130 may determine that the noise does not exist at the corresponding position (or node) when the differential value is within the reference range.

In some embodiments, the touch panel driver 130 may determine the reference range based on differential values DV_A2 corresponding to the second area A2 (e.g., refer to FIG. 4). The differential values DV_A2 may refer to a difference between the sensing signals in the second area A2 and may include twenty-first differential value DV21 to an (n−1) m-th differential value DV (n−1) m. Because the first area A1 is an area where noise is expected to occur, only the differential values DV_A2 corresponding to the second area A2 may be used, but the present disclosure is not limited thereto.

For example, the touch panel driver 130 may average the differential values DV_A2 to calculate an average value DV_REF (or a reference value) and compare each differential value with the average value DV_REF.

In some examples, with reference to FIG. 9, second differential data DDATA2 may be obtained by dividing the first differential data DDATA1 by the average value DV_REF. For example, a first value DV11/DV_REF of the second differential data DDATA2 may indicate a ratio between the first differential value DV11 and the average value DV_REF. Further, when the first value is 3 or more, the touch panel driver 130 may determine that the noise occurs at a point corresponding to the first value, that is, an area where a capacitance (e.g., an parasitic capacitance) is formed because the first driving electrode TX1 and the first sensing electrode RX1 cross or are adjacent to each other.

In some embodiments, the touch panel driver 130 may determine that the noise occurs in the first area A1 when the number of values outside the reference range among ratio values DV_RX1 and DV_RXn corresponding to the first area A1 exceeds a reference number. For example, when a ratio of values outside the reference range among the ratio values DV_RX1 corresponding to the first sensing electrode RX1 (e.g., refer to FIG. 4) is 70% or more, the touch panel driver 130 may determine that the noise occurs in an area corresponding to the first sensing electrode RX1. In this case, the touch panel driver 130 may sense an input to a corresponding area based on the sensing signal of the first sensing electrode RX1 and the sensing signal of the first sub-electrode RX_S1. In other examples, when a ratio of values outside the reference range among the ratio values DV_RXn corresponding to the n-th sensing electrode RXn (e.g., refer to FIG. 4) is less than 70%, the touch panel driver 130 may determine that the noise does not occur in an area corresponding to the n-th sensing electrode RXn. In this case, the touch panel driver 130 may sense an input to a corresponding area based on the sensing signal of the n-th sensing electrode RXn and not the sensing signal of the n-th sub-electrode RX_Sn.

In some embodiments, the touch panel driver 130 may determine whether the noise exists and a identify sensing method according thereto (e.g., whether to use the sub-electrode RX_S) through the process described with reference to FIGS. 6 to 9 in a setting mode, and may perform the sensing operation according to the sensing method determined in a normal mode.

As described above, the touch panel driver 130 may determine whether the noise exists and an area where the noise occurs, by comparing the sensing signal in the first period P1 (i.e., a period in which the noise may occur) and the sensing signal in the second period P2 (i.e., a period in which the noise does not exist).

Figure 10:
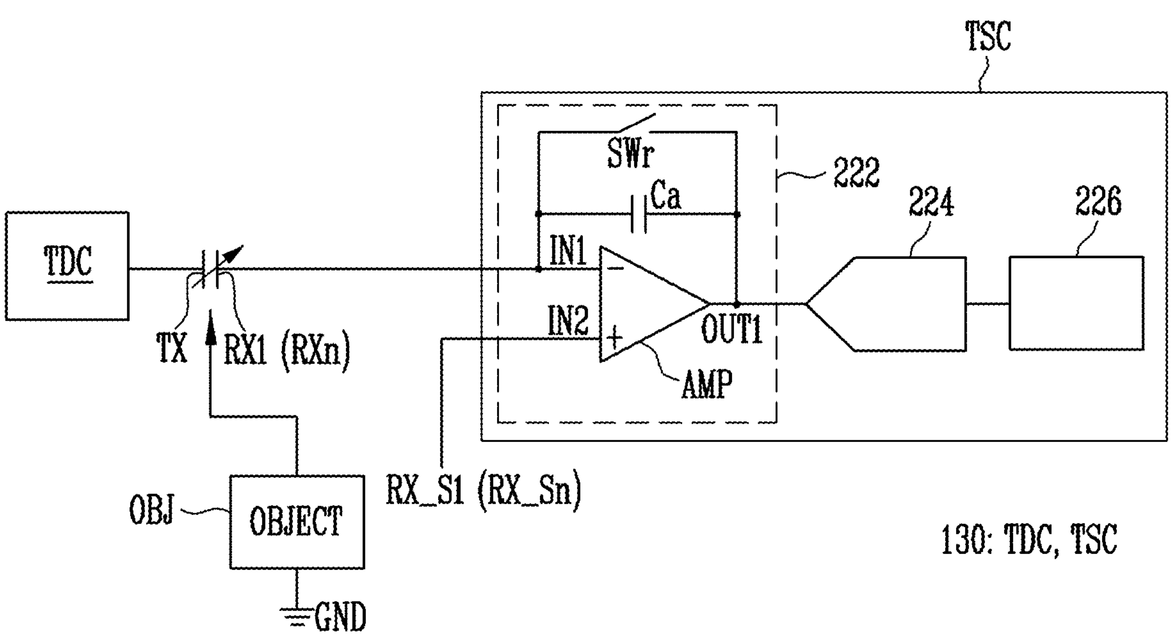
FIGS. 10 and 11 are diagrams illustrating the touch panel driver connected to the touch panel of FIG. 4 according to some embodiments of the present disclosure.
Figure 11:
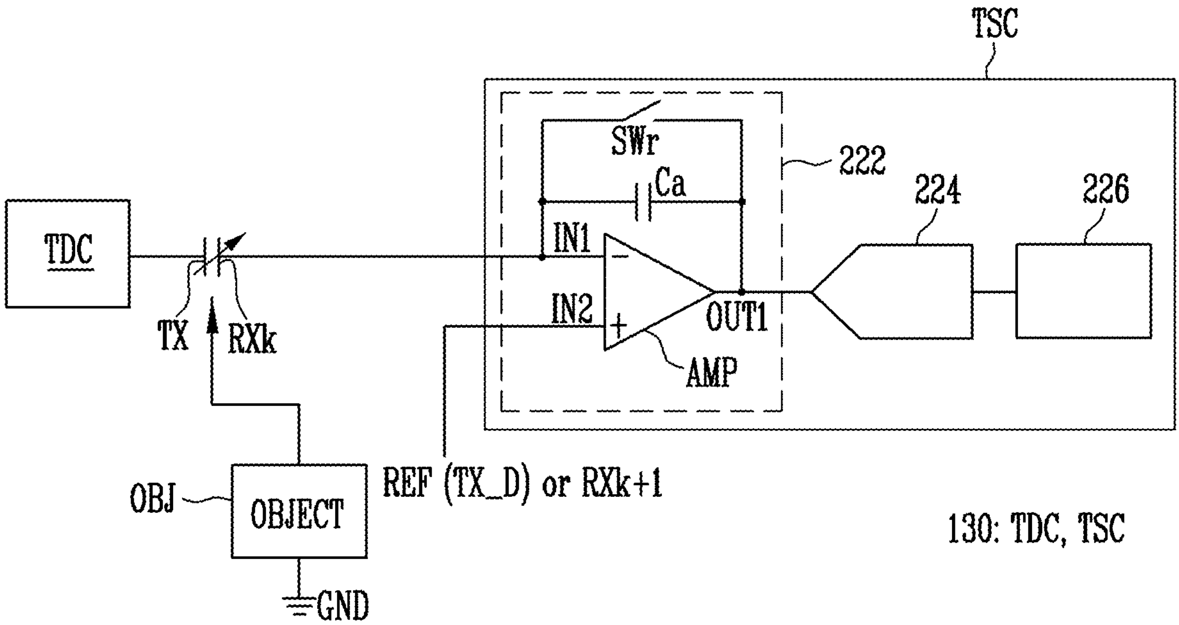

FIGS. 10 and 11 are diagrams illustrating the touch panel driver connected to the touch panel of FIG. 4 according to some embodiments of the present disclosure. In FIG. 10, the touch panel driver 130 is shown based on a channel where noise occurs (e.g., the first sensing electrode RX1 and/or the n-th sensing electrode RXn), and in FIG. 11, the touch panel driver 130 is shown based on a channel where the noise does not occur (e.g., a k-th sensing electrode RXk, where k is a positive integer less than n). For convenience of description, in FIGS. 10 and 11, the driving electrode TX and an object OBJ are further shown.

First, referring to FIGS. 4 and 10, the touch panel driver 130 may include a receiving unit TSC (or a receiving circuit) and a transmitting unit TDC (or a transmitting circuit). The transmitting unit TDC may be connected to the driving electrode TX, and the receiving unit TSC may be connected to the first sensing electrode RX1.

The receiving unit TSC may include a sensor channel 222, an analog-to-digital converter 224, and a processor 226. For example, each sensor channel 222 may be implemented as an analog front end (AFE) including at least one operational amplifier AMP. The analog-to-digital converter 224 and the processor 226 may be provided for each sensor channel 222 and may be shared by a plurality of sensor channels 222.

A first input terminal IN1 of the operational amplifier AMP may be connected to the first sensing electrode RX1, and a second input terminal IN2 of the operational amplifier AMP may be connected to the first sub-electrode RX_S1. For example, the first input terminal IN1 may be an inverting terminal, and the second input terminal IN2 may be a non-inverting terminal. A capacitor Ca and a switch SWr may be connected in parallel between the first input terminal IN1 and an output terminal OUT1 of the operational amplifier AMP. For example, when the switch SWr is turned on, the charges of the capacitor Ca may be initialized. At a time point when the sensing signal is received, the switch SWr may be in a turned-off state.

The sensor channel 222 may generate an output signal corresponding to a voltage difference between the first and second input terminals IN1 and IN2. Substantially the same noise may occur in the paired first sensing electrode RX1 and the first sub-electrode RX_S1, and a capacitance (e.g., an parasitic capacitance) between the first sensing electrode RX1 and the driving electrode TX may be greater than a capacitance (e.g., an parasitic capacitance) between the first sub-electrode RX_S1 and the driving electrode RX. Therefore, the sensor channel 222 connected to the first sensing electrode RX1 and the first sub-electrode RX_S1 may output a sensing signal of the first sensing electrode RX1 from which the noise is removed or a signal corresponding thereto.

The analog-to-digital converter 224 may be connected to the output terminal OUT1 of the operational amplifier AMP. The analog-to-digital converter 224 may convert an output of the operational amplifier AMP into a digital sensing value and output the digital sensing value. The processor 226 may sense the input by the object OBJ by analyzing the sensing values.

When noise occurs in an area where the n-th sensing electrode RXn is positioned, the sensor channel 220 for the n-th sensing electrode RXn may be connected to the n-th sub-electrode RX_Sn. A sensing method using a corresponding sensing electrode and a sub-electrode corresponding thereto may be referred to as a first sensing method, and the touch panel driver 130 may perform a sensing operation in the first sensing method on an area where noise occurs.

Referring to FIGS. 10 and 11, only a connection configuration of the second input terminal IN2 of the operational amplifier AMP is changed. For example, the touch panel driver 130 may change the connection configuration of the second input terminal IN2 using a switch, a multiplexer, and the like.

In some embodiments, when noise does not occur in an area where the k-th sensing electrode RXk is positioned, the first input terminal IN1 of the operational amplifier AMP may be connected to the k-th sensing electrode RXk, and a reference signal REF may be applied to the second input terminal IN2 of the operational amplifier AMP. The reference signal REF may be a ground voltage (e.g., a ground reference voltage) or a voltage of a specific magnitude. According to some embodiments, the reference signal REF may be a signal provided through a dummy electrode TX_D (e.g., refer to FIG. 4). The dummy electrode TX_D may be arranged to correspond to the driving electrode TX or may be one of the driving electrodes TX, but is not limited thereto. The reference signal REF may be commonly provided to remaining sensor channels except for (i.e., excluding) the sensor channel 222 of FIG. 10. A sensing method using the reference signal REF may be referred to as a second sensing method, and the touch panel driver 130 may perform a sensing operation using the second sensing method on an area where noise does not exist.

In some other embodiments, the second input terminal IN2 of the operational amplifier AMP may be connected to an adjacent sensing electrode, for example, a (k+1)-th sensing electrode RXk adjacent to the k-th sensing electrode RXk+1 instead of the reference signal REF. A sensing method using mutually adjacent sensing electrodes may be referred to as a third sensing method, and the touch panel driver 130 may perform a sensing operation using the third sensing method on an area where noise does not exist.

As described above, the touch panel driver 130 may perform the sensing operation using the first sensing method on the area where noise occurs, and may perform the sensing operation using the second sensing method or the third sensing method on the area where noise does not occur.

FIGS. 12, 13, 14, and 15 are plan views illustrating the touch panel included in the display device of FIG. 1 according to some embodiments of the present disclosure.

Referring to FIGS. 4 and 12 to 15, each of touch panels 110_1 to 110_4 of FIGS. 12 to 15 may be the same or similar to the touch panel 110 of FIG. 4 except for a position of the sub-electrode RX_S (or the first area A1 where the sub-electrode RX_S is positioned). Therefore, overlapping descriptions may not be repeated.

In some embodiments, the first area A1 may include a first peripheral area corresponding to an upper side of the base layer 111 (or the display panel) and a second peripheral area corresponding to a lower side of the base layer 111, and at least two sub-electrodes RX_S may be disposed in each of the first and second peripheral areas.

Figure 12:
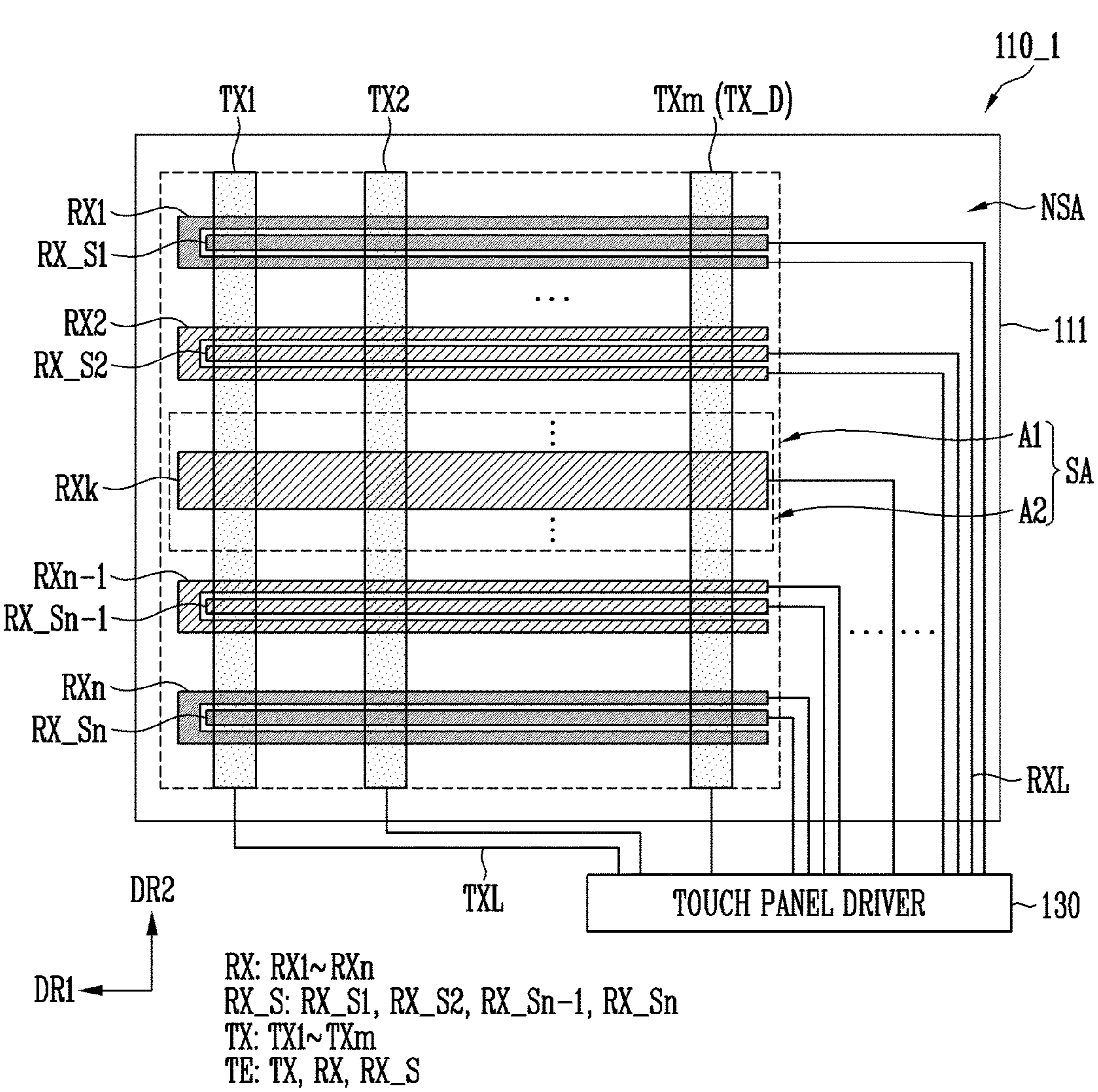
FIGS. 12, 13, 14, and 15 are plan views illustrating the touch panel included in the display device of FIG. 1 according to some embodiments of the present disclosure.

Referring to FIG. 12, for example, the first sub-electrode RX_S1 and the second sub-electrode RX_S2 may be disposed in the first peripheral area corresponding to the upper side of the touch panel 110_1, and the (n−1)-th sub-electrode RX_Sn−1 and the n-th sub-electrode RX_Sn may be disposed in the second peripheral area corresponding to the lower side. The second sub-electrode RX_S2 may be positioned as a pair with the second electrode RX2, and a disposition relationship between the second sub-electrode RX_S2 and the second electrode RX2 may be the same as a disposition relationship between the first sub-electrode RX_S1 and the first electrode RX1. Similarly, the (n−1)-th sub-electrode RX_Sn−1 may be positioned as a pair with the (n−1)-th electrode RXn−1.

The k-th sensing electrode RXk is disposed in the second area A2, and the sub-electrode RX_S is not disposed in the second area A2.

In some embodiments, the first area A1 may include only a peripheral area corresponding to one side of the base layer 111 (or the display panel), and at least one sub-electrode RX_S may be disposed in the peripheral area.

Figure 13:
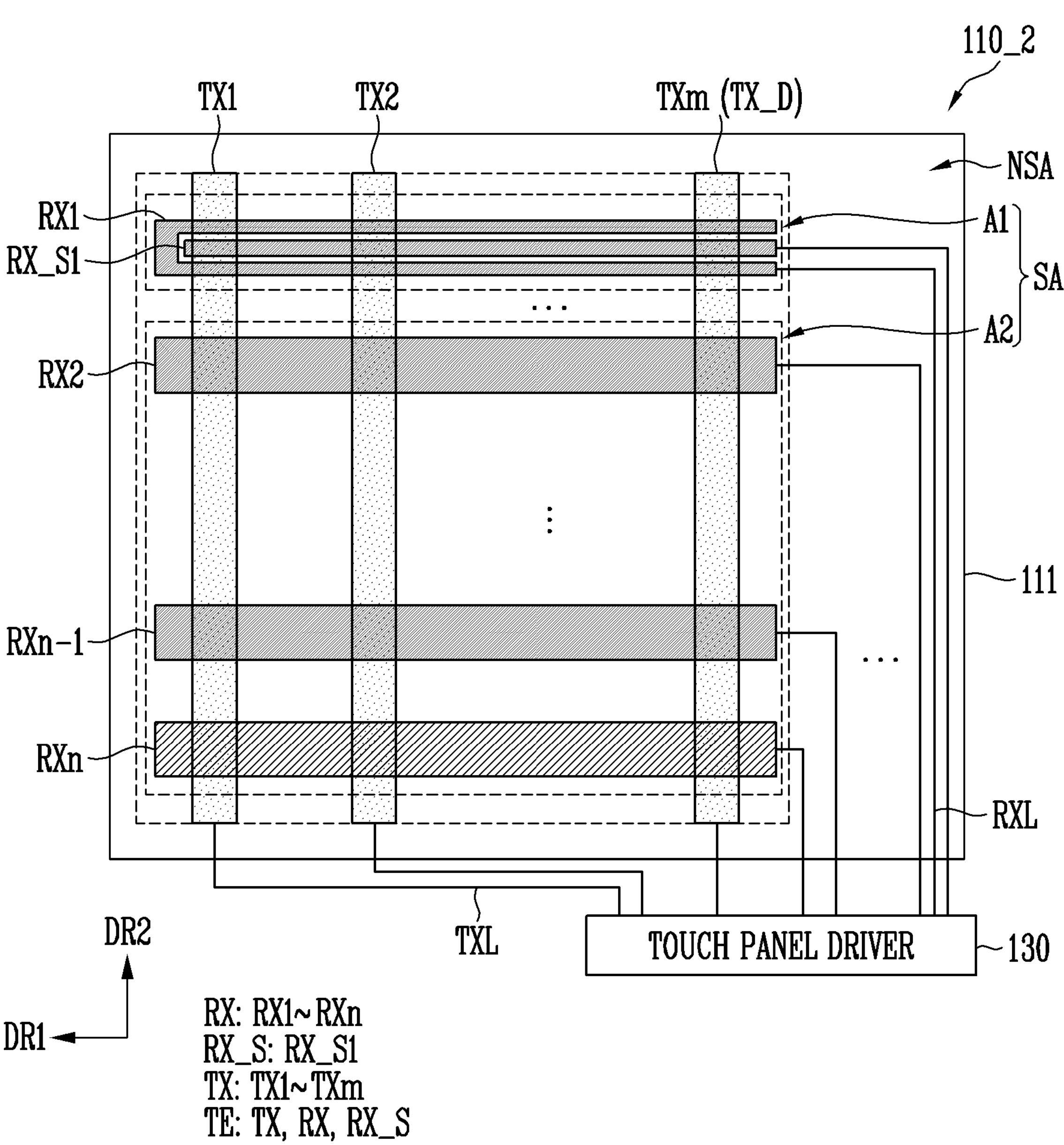

Referring to FIG. 13, for example, the first sub-electrode RX_S1 may be disposed in a first peripheral area corresponding to an upper side of the touch panel 110_2. The sub-electrode RX_S is not disposed in a remaining area outside of the first peripheral area. In other examples, the sub-electrode RX_S may be disposed only in a second peripheral area corresponding to a lower side of the touch panel 110_2 instead of the upper side of the touch panel 110_2.

In some embodiments, the first area A1 may be positioned inside the second area A2.

Figure 14:
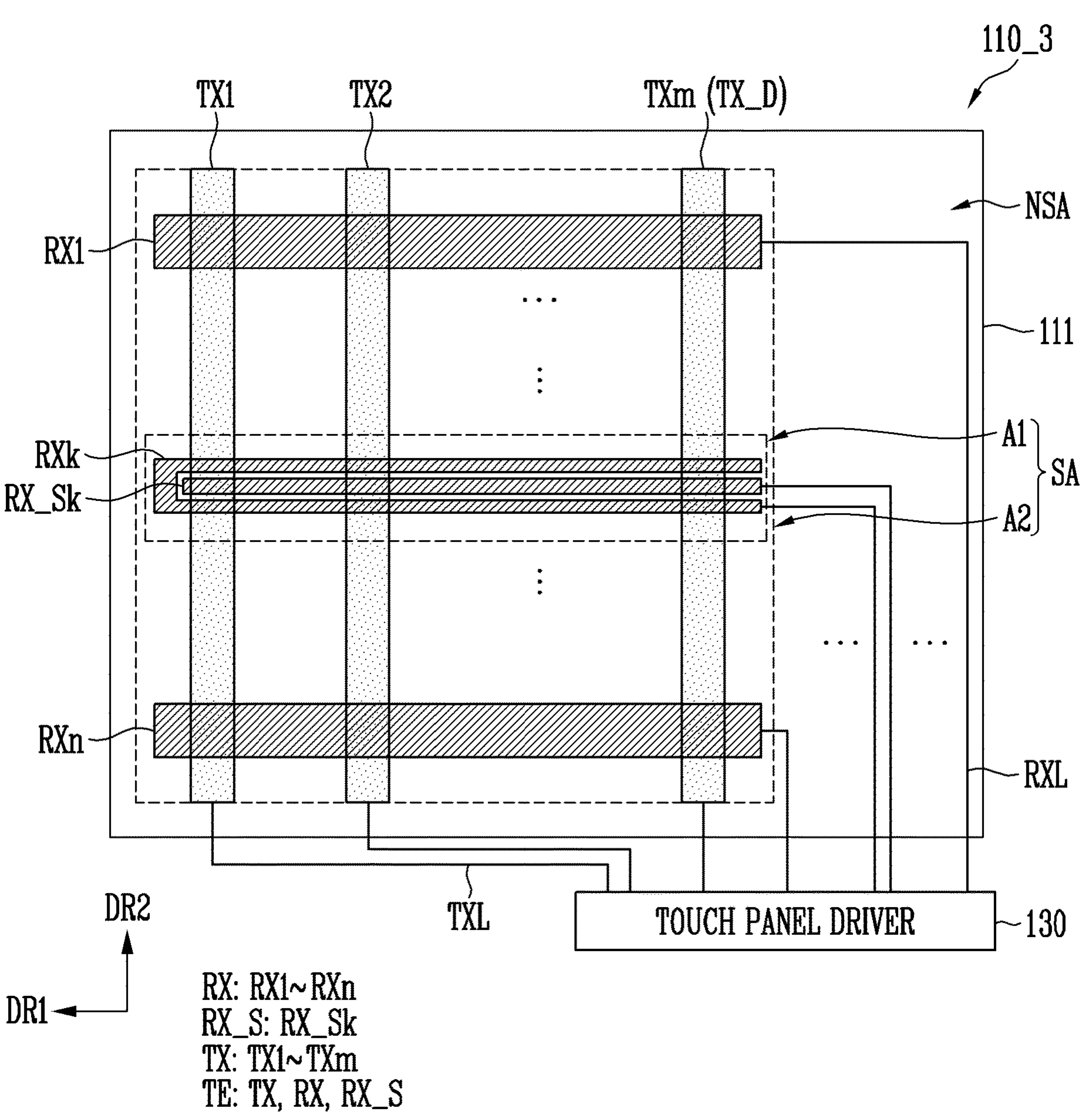

Referring to FIG. 14, for example, a central area of the touch panel 110_3 may be set as the first area A1, and the k-th sub-electrode RX_Sk may be disposed in the central area of the touch panel 110_3. The k-th sub-electrode RX_Sk may be positioned as a pair with the k-th sub-electrode RX_Sk. The sub-electrode RX_S is not disposed in the second area A2 of the touch panel 110_3, for example, in a peripheral area of the touch panel 110_3.

In some embodiments, the sub-electrode RX_S may be disposed in the entire sensing area SA. In other words, the entire sensing area SA may be set as the first area A1.

Figure 15:
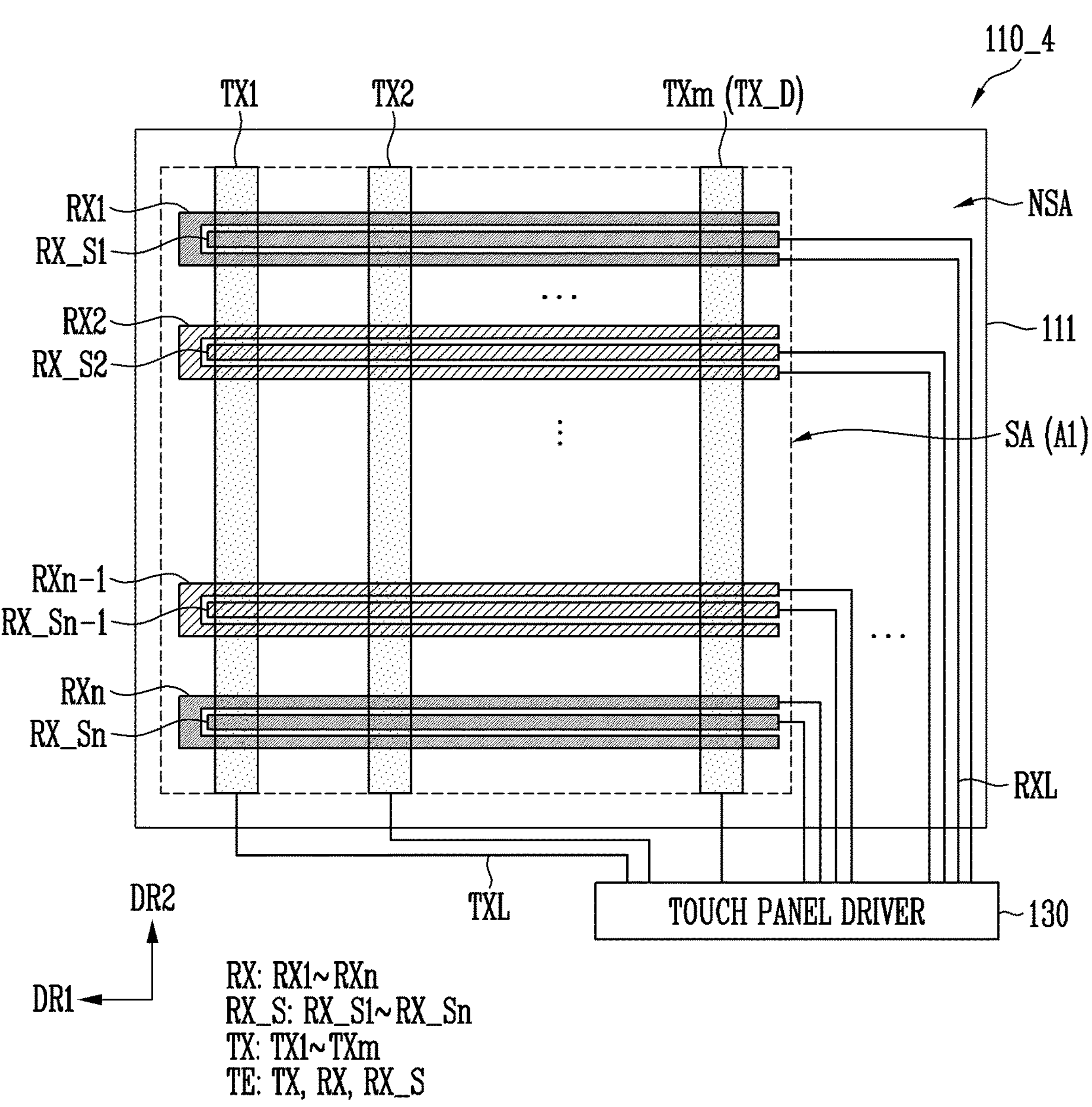

Referring to FIG. 15, for example, the first to n-th sub-electrodes RX_S1 to RX_Sn may be disposed in the entire sensing area SA of the touch panel 110_4. Compared to FIG. 4, the number of sensing lines RXL may increase, and a space (e.g., the non-sensing area NSA) where the sensing line RXL is disposed may increase.

As described above, an arbitrary area of the sensing area SA where noise occurs or noise is expected to occur may be set as the first area A1, and the sub-electrode RX_S may be disposed in the first area A1.

Figure 16:
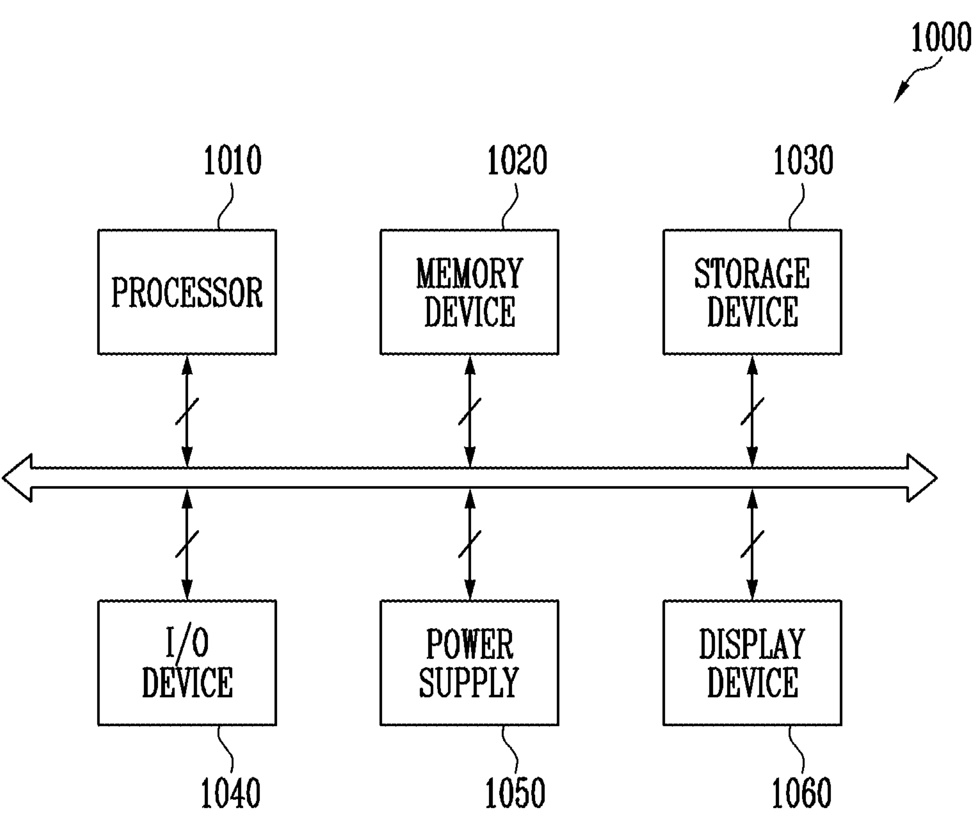
FIG. 16 is a block diagram illustrating an electronic device according to some embodiments of the present disclosure.

FIG. 16 is a block diagram illustrating an electronic device according to some embodiments of the present disclosure.

Referring to FIG. 16, the electronic device 1000 may include a processor 1010, a memory device 1020, a storage device 1030, an input/output device 1040, a power supply 1050, and a display device 1060. At this time, the display device 1060 may be the display device of FIG. 1. In addition, the electronic device 1000 may further include several ports capable of communicating with a video card, a sound card, a memory card, a USB device, and/or communicating with other systems. In some embodiments, the electronic device 1000 may be implemented as a smart phone. However, this is merely an example, and the electronic device 1000 is not limited thereto. For example, the electronic device 1000 may be implemented as a mobile phone, a video phone, a smart pad, a smart watch, a tablet PC, a vehicle navigation device, a computer monitor, a notebook computer, a head mounted display device, a television, or the like.

The processor 1010 may perform specific calculations or tasks. According to some embodiments, the processor 1010 may be a microprocessor, a central processing unit, an application processor, or the like. The processor 1010 may be connected to other components through an address bus, a control bus, a data bus, or the like. According to some embodiments, the processor 1010 may also be connected to an expansion bus such as a peripheral component interconnect (PCI) bus.

The memory device 1020 may store data that is utilized in the operation of the electronic device 1000. For example, the memory device 1020 may include a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM), and a ferroelectric random access memory (FRAM) device, a volatile memory device such as a dynamic random access memory (DRAM) device, a static random access memory (SRAM) device, and a mobile DRAM device, and/or the like.

The storage device 1030 may include a solid state drive (SSD), a hard disk drive (HDD), a CD-ROM, and the like. The input/output device 1040 may include an input means such as a keyboard, a keypad, a touch pad, a touch screen, and a mouse, and an output means such as a speaker and a printer. According to some embodiments, the display device 1060 may be included in the input/output device 1040.

The power supply 1050 may supply power necessary for an operation of the electronic device 1000. For example, the power supply 1050 may be a power management integrated circuit (PMIC).

The display device 1060 may display an image corresponding to visual information of the electronic device 1000. At this time, the display device 1060 may be an organic light emitting display device or a quantum dot light emitting display device, but is not limited thereto. The display device 1060 may be connected to other components through the buses or other communication links.

Figure 17:
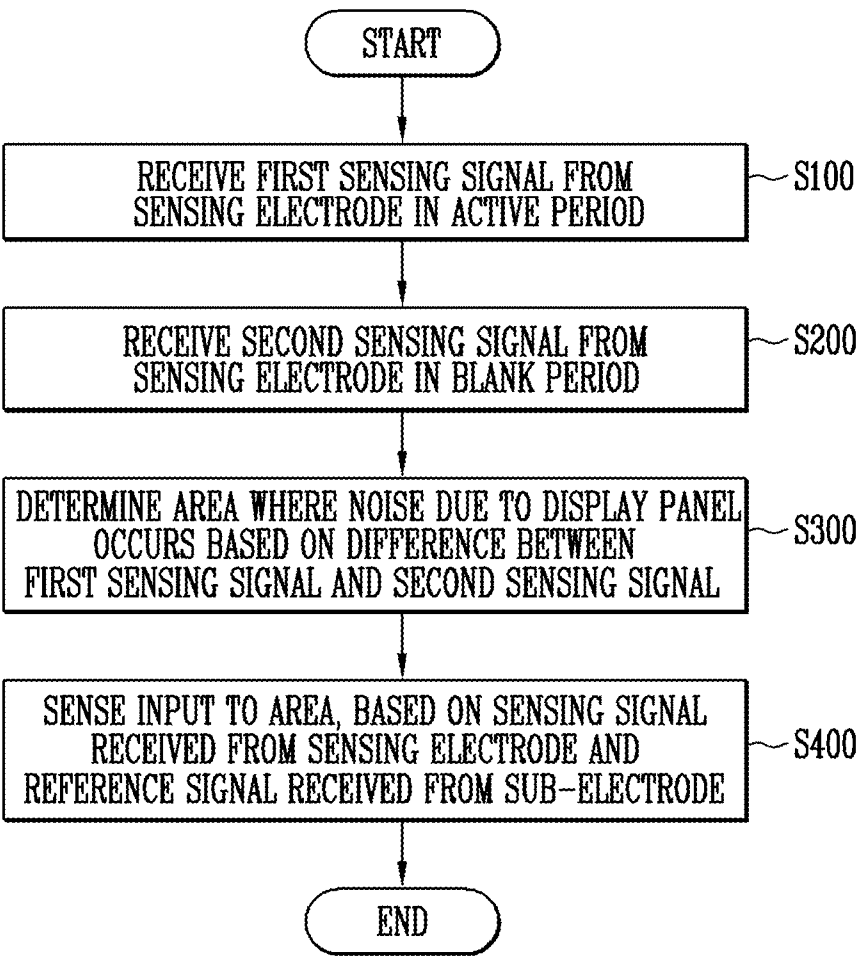
FIG. 17 is a flow diagram illustrating a method of driving a display device according to some embodiments of the present disclosure.

FIG. 17 is a flow diagrams illustrating a method of driving a display device according to some embodiments of the present disclosure.

Referring to FIGS. 1 and 17, the method of FIG. 17 may be performed in the display device 100 of FIG. 1.

The method of FIG. 17 may include receiving a first sensing signal from the sensing electrode RX (or the sensor electrode) in the active period of one frame (S100).

As described with reference to FIGS. 6 and 7, the method of FIG. 17 may include receiving the sensing signal from the sensing electrode RX in the first period P1, and generating the first sensing data SDATA1 based on the sensing signal of the first period P1.

Thereafter, the method of FIG. 17 may include receiving a second sensing signal from the sensing electrode RX (or the sensor electrode) in the blank period of one frame (S200).

As described with reference to FIGS. 6 and 7, the method of FIG. 17 may include receiving the sensing signal from the sensing electrode RX in the second period P2, and generating the second sensing data SDATA2 based on the sensing signal of the second period P2.

Thereafter, the method of FIG. 17 may include determining an area where noise due to the display panel 120 occurs based on a difference between the first sensing signal and the second sensing signal (S300). For example, the area may be one area of the touch panel 110, for example, the first area A1 of FIG. 4.

As described with reference to FIGS. 8 and 9, the method of FIG. 17 may include generating the first differential data DDATA1 by performing a difference operation on the first sensing data SDATA1 and the second sensing data SDATA2, determining whether each value of the first differential data DDATA1 is outside the reference range, and determining the area where noise occurs based on a result of the determination. For example, the method of FIG. 17 may include determining whether each of the differential values DV11 to DV1*m* and DVn1 to DVnm (e.g., refer to FIG. 8) corresponding to the first area A1 is outside the reference range, and determining that at least a portion of the first area A1 is the area where noise occurs based on the determination result.

Thereafter, the method of FIG. 17 may include using a sensing method for the area where noise occurs and a sensing method for a remaining area (i.e., a remaining area of the sensing area SA). For example, as described with reference to FIG. 10, the method of FIG. 17 may utilize the first sensing method using the sub-electrode RX_S for the area where noise occurs, and utilize the second sensing method using the reference signal REF (or the dummy electrode TX_D) or the third sensing method using the adjacent sensing electrode for the remaining area.

Thereafter, in the normal mode, the method of FIG. 17 may include performing the sensing operation according to the set sensing method. For example, the method of FIG. 17 may include sensing the input to the area (i.e., the area where noise occurs), based on the sensing signal received from the sensing electrode RX and the sensing signal (or the reference signal) received from the sub-electrode, according to the first sensing method (S400). In addition, the method of FIG. 17 may include sensing the input to the remaining area using only the sensing signal of the sensing electrode except for the sensing signal (or the reference signal) of the sub-electrode, according to the second sensing method or the third sensing method.

As described above, the method of FIG. 17 may include sensing or determining the area where noise occurs using the blank period of the frame, and may include performing the sensing operation using different sensing methods on the area where noise occurs and the remaining area.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A display device comprising:
- a display panel having a first area and a second area;
- sensor electrodes in the first area and the second area;
- at least one sub-electrode in the first area and separated from the sensor electrodes, the at least one sub-electrode comprising a first sub-electrode; and
- a driver electrically connected to the sensor electrodes and the at least one sub-electrode, and configured to sense an input to the display panel based on a sensing signal received from the sensor electrodes and a reference signal received from the at least one sub-electrode,
- wherein a first end of the first sub-electrode is connected to the driver, and a second end of the first sub-electrode that is opposite to the first end of the first sub-electrode is surrounded by a first sensor electrode of the sensor electrodes.

2. The display device according to claim 1, wherein the at least one sub-electrode is not on the second area, and
- wherein a number of the at least one sub-electrode is less than a number of the sensor electrodes.

3. The display device according to claim 2, wherein the sensor electrodes extend in a first direction and are arranged along a second direction, and the at least one sub-electrode extends in the first direction, in a plan view.

4. The display device according to claim 3, wherein
- the first sub-electrode is positioned inside the first sensor electrode and substantially surrounded by the first sensor electrode in a plan view.

5. The display device according to claim 1, wherein the first area is positioned outside the second area, and the first and second areas are centered at a center area of the display panel in a plan view.

6. The display device according to claim 5, wherein the at least one sub-electrode further comprises a second sub-electrode,
- wherein the first sub-electrode is positioned in a first peripheral area corresponding to a first side of the display panel, and
- wherein the second sub-electrode is positioned in a second peripheral area corresponding to a second side of the display panel opposite the first side.

7. The display device according to claim 1, wherein the first area is positioned inside the second area in a plan view.

8. The display device according to claim 1, wherein the sensor electrodes comprise the first sensor electrode in the first area and second sensor electrodes in the second area, and
- wherein the driver is configured to sense an input to the first area based on a first sensing signal received from the first sensor electrode and the reference signal, and to sense an input to the second area based on a second sensing signal received from each of the second sensor electrodes except for the reference signal.

9. The display device according to claim 1, wherein the display panel displays an image in a frame period, the frame period comprises an active period and a blank period, and
- wherein the driver is configured to receive first sensing signals from the sensor electrodes in the active period, to receive second sensing signals from the sensor electrodes in the blank period, and to determine whether noise due to the display panel exists based on a difference between the first sensing signals and the second sensing signals.

10. The display device according to claim 9, wherein in response to the difference in the first area being outside a reference range, the driver is configured to determine that the noise exists in the first area and to sense the input based on the reference signal and the sensing signal, and Wherein, in response to the difference in the first area being within the reference range, the driver is configured to determine that the noise does not exist in the first area and to sense the input based on the sensing signal and not the reference signal.

11. The display device according to claim 10, wherein the reference range is set based on the difference in the second area.

12. The display device according to claim 10, wherein the driver is configured to calculate the difference at each of a plurality of points in the first area, and to determine that the noise exists in the first area in response to a number of points for which the difference is outside the reference range exceeding a reference number.

13. The display device according to claim 1, wherein the display panel comprises:

a light emitting element on a substrate; and an insulating layer on the light emitting element and covering the light emitting element, and wherein the sensor electrodes and the at least one sub-electrode are directly on the insulating layer.

14. The display device according to claim 13, wherein the sensor electrodes overlap a cathode electrode of the light emitting element in the second area, and wherein a portion of the sensor electrodes does not overlap the cathode electrode or a thickness of the cathode electrode is thinner than an average thickness of the cathode electrode in the first area.

15. A display device comprising:

a display panel;

sensor electrodes and sub-electrodes on the display panel, the sensor electrodes comprising a first sensor electrode and a second sensor electrode, and the sub-electrodes comprising a first sub-electrode paired with the first sensor electrode and a second sub-electrode paired with the second sensor electrode; and a driver electrically connected to the sensor electrodes and the sub-electrodes and configured to sense an input to the display panel based on a sensing signal received from the sensor electrodes and a reference signal received from the sub-electrodes, wherein the driver is configured to sense a first input at a first position corresponding to the first sensor electrode based on a first sensing signal of the first sensor electrode and a first reference signal of the first sub-electrode, and to sense a second input at a second position corresponding to the second sensor electrode based on a second sensing signal of the second sensor electrode without a second reference signal of the second sub-electrode based on the second position being associated with less noise than the first position.

16. The display device according to claim 15, wherein the sensor electrodes extend in a first direction and are arranged along a second direction, and the sub-electrodes extend in the first direction and are arranged along the second direction in a plan view.

17. The display device according to claim 16, wherein the first sub-electrode is positioned inside the first sensor electrode and is substantially surrounded by the first sensor electrode, and the second sub-electrode is positioned inside the second sensor electrode and is substantially surrounded by the second sensor electrode in a plan view.

18. The display device according to claim 15, wherein the display panel displays an image in a frame period, the frame period comprises an active period and a blank period, and wherein the driver is configured to receive first sensing signals from the sensor electrodes in the active period, to receive second sensing signals from the sensor electrodes in the blank period, and to identify the first sensor electrode and the second sensor electrode based on a difference between the first sensing signals and the second sensing signals.

19. The display device according to claim 18, wherein in response to the difference for one of the sensor electrodes being outside a reference range, the driver is configured to identify one of the sensor electrodes as the first sensor electrode, and in response to the difference for one of the sensor electrodes being within the reference range, the driver is configured to identify one of the sensor electrodes as the second sensor electrode.

20. A method of driving a display device comprising sensor electrodes on a display panel, the method comprising:

receiving a first sensing signal from the sensor electrodes in an active period of a frame;

receiving a second sensing signal from the sensor electrodes based on a driving signal applied in a blank period of the frame; and identifying an area in which noise due to the display panel is generated based on a difference between the first sensing signal and the second sensing signal.

21. The method according to claim 20, further comprising:

sensing an input to the area based on a sensing signal received from the sensor electrodes and a reference signal received from a sub-electrode, and wherein the sub-electrode is arranged as a pair with one of the sensor electrodes in the area.

* * * * *